(12) United States Patent
Ijiri

(10) Patent No.: US 12,159,386 B2
(45) Date of Patent: Dec. 3, 2024

(54) INSPECTION SYSTEM, DISCRIMINATION SYSTEM, AND LEARNING DATA GENERATION DEVICE

(71) Applicant: OMRON Corporation, Kyoto (JP)

(72) Inventor: Yoshihisa Ijiri, Tokyo (JP)

(73) Assignee: OMRON Corporation, Kyoto (JP)

( * ) Notice: Subject to any disclaimer, the term of this patent is extended or adjusted under 35 U.S.C. 154(b) by 1016 days.

(21) Appl. No.: 16/976,461

(22) PCT Filed: Mar. 13, 2019

(86) PCT No.: PCT/JP2019/010179
§ 371 (c)(1),
(2) Date: Aug. 27, 2020

(87) PCT Pub. No.: WO2019/176989
PCT Pub. Date: Sep. 19, 2019

(65) Prior Publication Data
US 2021/0004721 A1 Jan. 7, 2021

(30) Foreign Application Priority Data
Mar. 14, 2018 (JP) .................................. 2018-047260

(51) Int. Cl.
*G06T 7/00* (2017.01)
*G06F 18/2115* (2023.01)
(Continued)

(52) U.S. Cl.
CPC ........ *G06T 7/0004* (2013.01); *G06F 18/2115* (2023.01); *G06F 18/2132* (2023.01);
(Continued)

(58) Field of Classification Search
None
See application file for complete search history.

(56) References Cited

U.S. PATENT DOCUMENTS

2012/0123978 A1\* 5/2012 Toderice ................ G06V 20/70
706/12
2016/0098632 A1\* 4/2016 Sutskever .............. G06N 3/044
706/25
(Continued)

FOREIGN PATENT DOCUMENTS

CN 1823298 8/2006
CN 101198987 6/2008
(Continued)

OTHER PUBLICATIONS

"International Search Report (Form PCT/ISA/210) of PCT/JP2019/010179", mailed on Jun. 11, 2019, with English translation thereof, pp. 1-4.
(Continued)

*Primary Examiner* — Emily C Terrell
*Assistant Examiner* — Nathan J Bloom
(74) *Attorney, Agent, or Firm* — JCIPRNET

(57) ABSTRACT

A characteristic included in data is determined with relatively high precision. An inspection system according to one aspect of the present invention acquires a plurality of learning data sets respectively including a combination of image data and correct answer data, and sets a difficulty level of determination for each of the learning data sets in accordance with a degree to which a result which is obtained by determining the acceptability of a product in the image data of each of the learning data sets by a first discriminator conforms to a correct answer indicated by the correct answer data. Besides, the inspection system constructs a second discriminator that determines the acceptability of the product by executing stepwise machine learning in which the learning data sets are utilized in ascending order of the set difficulty level.

19 Claims, 13 Drawing Sheets

(51) Int. Cl.
  *G06F 18/2132* (2023.01)
  *G06F 18/214* (2023.01)
  *G06F 18/2413* (2023.01)
  *G06N 3/045* (2023.01)
  *G06N 3/0464* (2023.01)
  *G06N 20/00* (2019.01)
  *G06V 10/764* (2022.01)
  *G06V 10/771* (2022.01)
  *G06V 10/774* (2022.01)
  *G06V 10/776* (2022.01)
  *G06V 10/82* (2022.01)

(52) U.S. Cl.
  CPC ........ *G06F 18/214* (2023.01); *G06F 18/2413* (2023.01); *G06N 3/045* (2023.01); *G06N 3/0464* (2023.01); *G06N 20/00* (2019.01); *G06V 10/764* (2022.01); *G06V 10/771* (2022.01); *G06V 10/774* (2022.01); *G06V 10/776* (2022.01); *G06V 10/82* (2022.01); *G06T 2207/20081* (2013.01); *G06T 2207/20084* (2013.01)

(56) References Cited

U.S. PATENT DOCUMENTS

| | | | |
|---|---|---|---|
| 2019/0147372 A1* | 5/2019 | Luo | G06N 20/00 706/20 |
| 2020/0151591 A1* | 5/2020 | Li | G06N 3/08 |
| 2020/0356813 A1* | 11/2020 | Sharma | G06F 18/22 |

FOREIGN PATENT DOCUMENTS

| | | | |
|---|---|---|---|
| CN | 102362282 | 2/2012 | |
| CN | 104915632 | 9/2015 | |
| CN | 106548179 A | * 3/2017 | ........... G06K 9/4671 |
| EP | 1986046 | 10/2008 | |
| JP | H11344450 | 12/1999 | |
| JP | 2009140369 | 6/2009 | |
| JP | 2011096291 | 5/2011 | |
| JP | 2011214903 | 10/2011 | |
| JP | 2012026982 | 2/2012 | |
| JP | 2015191426 | 11/2015 | |
| JP | 2016051429 | 4/2016 | |
| JP | 2016197371 | 11/2016 | |
| JP | 2017102906 | 6/2017 | |
| JP | 2017211259 | 11/2017 | |
| JP | 2017211690 | 11/2017 | |
| JP | 2018005640 | 1/2018 | |
| TW | 201415379 | 4/2014 | |

OTHER PUBLICATIONS

"Written Opinion of the International Searching Authourity (Form/ISA/237) of PCT/JP2019/010179", mailed on Jun. 11, 2019, with English translation thereof, p. 1-p. 10.

"Office Action of China Counterpart Application", issued on Jun. 8, 2023, with English translation thereof, p. 1-p. 74.

"Office Action of Europe Counterpart Application", issued on Aug. 26, 2024, p. 1-p. 8.

* cited by examiner

INSPECTION SYSTEM, DISCRIMINATION SYSTEM, AND LEARNING DATA GENERATION DEVICE

CROSS-REFERENCE TO RELATED APPLICATION

This application is a 371 application of the international PCT application serial no. PCT/JP2019/010179, filed on Mar. 13, 2019, which claims the priority benefit of Japan application no. 2018-047260, filed on Mar. 14, 2018. The entirety of each of the above-mentioned patent applications is hereby incorporated by reference herein and made a part of this specification.

BACKGROUND

Technical Field

The present invention relates to an inspection system, a discrimination system, and a learning data generation device.

Related Art

Conventionally, in a scene such as a production line for manufacturing a product, a technique is used in which a product to be manufactured is photographed by a photographing device and the acceptability of the product is inspected based on the obtained image data. For example, in patent literature 1, an inspection device has been proposed which determines whether an inspection object in the image is normal or abnormal based on a first trained neural network, and classifies the type of abnormality based on a second trained neural network when the inspection object is determined to be abnormal.

Literature of Related Art

Patent Literature
Patent literature 1: Japanese Patent Laid-Open No. 2012-026982

SUMMARY

Problems to be Solved

The inventor of the present invention has found the following problem in the conventional technique which uses a discriminator such as the trained neural network or the like as in patent literature 1 to determine the acceptability of the product from the image data. That is, in order to perform machine-learning for acceptability determination of the product, a great amount of learning data of the product showing the state of acceptability is shown is used. When machine learning is performed using this great amount of learning data at once, there is a possibility that a discriminator with high generalization ability cannot be constructed for a reason of falling into a local solution that determines the acceptability of the product that appears in the learning data. For example, when defects of the product shown in the image which is the learning data are biased to a specific defect (for example, a dent), a discriminator which determines other defects (for example, dirt) cannot be constructed. In addition, for example, if machine learning is performed by collecting only the learning data in which discrimination of the acceptability of small dents or the like is difficult, there is a possibility that the machine learning takes time, and a discriminator may be constructed which determines a small stain which may not be a defective product as a defective product. That is, the inventor of the present invention has found that there is a problem in the conventional technique that even if a sufficient number of the learning data to perform the machine learning to acquire the ability of determining the acceptability of the product is prepared, there is a possibility that a high-performance discriminator cannot be obtained, and the determination of the acceptability of the product cannot be performed with high precision.

Besides, this problem is not unique to the scene for determining the acceptability of a product. A similar problem may arise in any scene where a discriminator is constructed by machine learning using learning data, such as a scene for discriminating some state of a subject from image data and a scene for discriminating some characteristic from data other than image data. That is, even if a sufficient number of the learning data to perform the machine learning to acquire the ability of determining the characteristics included in the data is prepared, there is a possibility that a high-performance discriminator cannot be obtained.

The present invention has been made in view of these circumstances in one aspect, and an objective thereof is to provide a technique capable of determining characteristics included in data with relatively high precision.

Means to Solve Problems

The present invention employs the following configuration to the above problems.

That is, an inspection system according to one aspect of the present invention inspects acceptability of a product and includes: a learning data acquisition part that acquires a learning data group which is configured by a plurality of learning data sets respectively comprising a combination of image data of the product and correct answer data indicating a correct answer to determination of the acceptability of the product in the image data; a difficulty level setting part that acquires output values corresponding to a result of determining the acceptability of the product in the input image data respectively from a plurality of first discriminators by inputting the image data of each of the learning data sets respectively to the plurality of first discriminators in which an ability to determine the acceptability of the product is acquired by machine learning, and sets a difficulty level of the determination of the acceptability for each of the learning data sets in accordance with a degree to which the output values respectively acquired from the plurality of first discriminators conform to the correct answer indicated by the correct answer data; a learning processing part that constructs, by executing stepwise machine learning in which the learning data sets are utilized in ascending order of the set difficulty level, a second discriminator which determines the acceptability of the product; a target data acquisition part that acquires target image data of the product which is an inspection target; and an acceptability determination part that acquires an output value from the second discriminator by inputting the acquired target image data to the second discriminator, and determines the acceptability of the product in the target image data based on the output value acquired from the second discriminator.

Among the learning data sets to be used for machine learning, there are learning data sets easy to be discriminated (that is, of which acceptability is easily determined) and learning data sets difficult to be discriminated (that is, of which acceptability is difficultly determined). When only the learning data sets easy to be discriminated are used to execute machine learning, there is a possibility that a discriminator that can handle a case where the determination of the acceptability of the product is difficult cannot be constructed. On the other hand, even when only the learning data sets difficult to be discriminated are used to execute machine learning, there is a possibility that a discriminator with high generalization ability cannot be constructed because of being conforms too much to discriminate in a special case.

Therefore, in the configuration, the plurality of first discriminators in which the determination of the acceptability of the product is acquired by machine learning are respectively used to set the difficulty level of the determination of the acceptability for each of the learning data sets included in the learning data group. Specifically, the output value corresponding to the result of determining the acceptability of the product in the input image data is acquired from each first discriminator by inputting the image data of each of the learning data sets to each first discriminator. Then, the difficulty level of the determination of the acceptability for each of the learning data sets in accordance with the degree to which the output value acquired from each first discriminator conforms to the correct answer indicated by the correct answer data is set. That is, as the acceptability can be correctly determined by each first discriminator, the difficulty level of the corresponding learning data sets is set low, and as the acceptability cannot be correctly determined by each first discriminator, the difficulty level of the corresponding learning data sets is set high.

Each first discriminator may be a tentative discriminator constructed by machine learning using a part of the learning data sets included in the learning data group. The determination of the acceptability of each first discriminator with respect to low difficulty-level learning data sets tends to be difficult to make an error, on the other hand, the determination of the acceptability of each first discriminator with respect to high difficulty-level learning data sets tends to be easy to make an error. Therefore, even if each first discriminator cannot completely correctly execute the determination of the acceptability of the product in the image data included in the learning data sets, the difficulty level of the each of the learning data sets can be set with a certain degree of certainty by the above process.

Then, in the configuration, the second discriminator which determines the acceptability of the product is constructed by performing stepwise machine learning in which the learning data sets are utilized in ascending order of the set difficulty level. Accordingly, after the second discriminator has acquired an overall (macro) tendency of the determination of the acceptability that appears in the learning data group by the low difficulty-level learning data sets, the second discriminator can acquire a specific (micro) tendency of the determination of the acceptability that appears in the learning data group by the high difficulty-level learning data sets.

Thus, in the process of the machine learning, it can be difficult to fall into a local solution for determining the acceptability of the product appears in the learning data sets, and the machine learning that effectively uses the prepared learning data group can be performed. That is, the second discriminator having a relatively high generalization performance that can be achieved by the prepared learning data group can be constructed. Therefore, according to the configuration, the acceptability of the product in the target image data can be determined with relatively high precision by the second discriminator constructed in this way.

Moreover, the "product" may not be particularly limited and may be appropriately selected according to the embodiment. The "product" may be, for example, a product transported on a production line for electronic parts, automobile parts, or the like. The electronic parts are, for example, substrates, chip capacitors, liquid crystals, relay windings, and the like. The automobile parts are, for example, connecting rods, shafts, engine blocks, power window switches, panels, and the like. "Determining the acceptability of the product" may include, for example, processes such as determining whether the product has a defect such as a scratch, specifying a type of the defect present in the product, deriving a probability that the product has or does not have a defect, and the like. The defects are, for example, scratches, dirt, cracks, dents, dust, burrs, color unevenness, and the like. In addition, from the viewpoint of appropriately evaluating the difficulty level of each of the learning data sets, preferably, the plurality of first discriminators are respectively constructed by machine learning under different learning conditions. The "learning conditions" can be specified by parameters of machine learning, learning data to be used (learning data sets), or the like. The "different learning conditions" refer to that, for example, at least one of the parameters of machine learning and the learning data to be used is different.

In the inspection system according to the above aspect, the difficulty level setting part may set a lower difficulty level for the learning data sets having a higher rate at which a result matches the correct answer indicated by the correct answer data, the result being obtained by determining the acceptability of the product based on the output values acquired from the plurality of first discriminators. According to the configuration, the difficulty level of the determination of the acceptability can be appropriately set for each of the learning data sets. Therefore, the second discriminator having a relatively high generalization performance that can be achieved by the prepared learning data group can be constructed, and accordingly, the acceptability of the product in the target image data can be determined with relatively high precision.

In the inspection system according to the above aspect, the difficulty level setting part may set the difficulty level of the determination of the acceptability for each of the learning data sets in accordance with a degree to which a sum or a product of the output values respectively acquired from the plurality of first discriminators conforms to the correct answer indicated by the correct answer data. According to the configuration, the difficulty level of the determination of the acceptability can be appropriately set for each of the learning data sets. Therefore, the second discriminator having a relatively high generalization performance that can be achieved by the prepared learning data group can be constructed, and accordingly, the acceptability of the product in the target image data can be determined with relatively high precision.

In the inspection system according to the above aspect, the difficulty level setting part may set a lower difficulty level for the learning data sets having a greater number of the first discriminators in which the result, which is obtained by determining the acceptability of the product based on the output values, matches the correct answer indicated by the correct answer data at a predetermined confidence level or higher.

According to the configuration, the difficulty level of the determination of the acceptability can be appropriately set for each of the learning data sets. Therefore, the second discriminator having a relatively high generalization performance that can be achieved by the prepared learning data group can be constructed, and accordingly, the acceptability of the product in the target image data can be determined with relatively high precision.

In the inspection system according to the above aspect, each of the first discriminators may be constructed by machine learning using a partial data group configured by a plurality of learning data sets selected from the learning data group. According to the configuration, the learning data sets prepared to construct the second discriminator may also be used as the learning data sets for constructing each first discriminator. Therefore, trouble of separately preparing learning data sets used for machine learning of each first discriminator can be omitted.

In the inspection system according to the above aspect, the learning data acquisition part may extract learning data sets having a specified difficulty level from the learning data group based on the difficulty level set for each of the learning data sets; collect additional image data similar to the image data included in the extracted learning data sets having a specified difficulty level; generate new learning data sets by giving correct answer data indicating a correct answer to determination of acceptability of the product in the additional image data to the collected additional image data; and add the generated new learning data sets to the learning data group. According to the configuration, when the number of the learning data sets included in the prepared learning data group is insignificant, learning data sets that contribute to improving the discrimination performance of the second discriminator can be additionally added. Therefore, the second discriminator having a relatively high generalization performance can be constructed, and accordingly, the acceptability of the product in the target image data can be determined with relatively high precision.

In addition, in the inspection system according to each embodiment described above, the plurality of discriminators (the first discriminators) is used to determine the difficulty level of each of the learning data sets. However, a method for determining the difficulty level of the learning data sets may not be limited to this example, and the difficulty level of each of the learning data sets may be determined using one discriminator. For example, an inspection system according to one aspect of the present invention which inspects acceptability of a product includes: a learning data acquisition part that acquires a learning data group which is configured by a plurality of learning data sets respectively including a combination of image data of the product and correct answer data indicating a correct answer to determination of the acceptability of the product in the image data; a difficulty level setting part that acquires output values corresponding to a result of determining the acceptability of the product in the input image data from a first discriminator by inputting the image data of each of the learning data sets to the first discriminator in which an ability to determine the acceptability of the product is acquired by machine learning, calculates a distance (norm) between the output values acquired from the first discriminator and a decision boundary of the first discriminator for determining the acceptability of the product, and sets a difficulty level of the determination of the acceptability for each of the learning data sets in accordance with the calculated distance; a learning processing part that constructs, by executing stepwise machine learning in which the learning data sets are utilized in ascending order of the set difficulty level, a second discriminator which determines the acceptability of the product; a target data acquisition part that acquires target image data of the product which is an inspection target; and an acceptability determination part that acquires an output value from the second discriminator by inputting the acquired target image data to the second discriminator, and determines the acceptability of the product in the target image data based on the output value acquired from the second discriminator.

The distance between the decision boundary of the discriminators and the output values of the discriminator indicates easiness of determining the acceptability of the product in the image data input to obtain the output values. The distance may be calculated, for example, by Euclidean distance. That is, the greater the distance between the decision boundary of the discriminators and the output values of the discriminator, the easier the determination of the acceptability of the product in the image data input to obtain the output values. On the other hand, the smaller the distance between the decision boundary of the discriminators and the output values of the discriminator, the difficult the determination of the acceptability of the product in the corresponding image data. Thus, according to the configuration, the difficulty level of each of the learning data sets can be appropriately set based on the distance between the decision boundary of the first discriminators and the output values. Therefore, the second discriminator having a relatively high generalization performance that can be achieved by the prepared learning data group can be constructed, and accordingly, the acceptability of the product in the target image data can be determined with relatively high precision.

In addition, from the inspection system according to each embodiment described above, for example, a part such as the part for setting the difficulty level, a part for determining the acceptability by the second discriminator, or the like may be extracted to configure a device according to another embodiment.

For example, a learning data generation device according to one aspect of the present invention includes: a learning data acquisition part that acquires a learning data group which is configured by a plurality of learning data sets respectively including a combination of image data of a product and correct answer data indicating a correct answer to determination of the acceptability of the product in the image data; a difficulty level setting part that acquires output values corresponding to a result of determining the acceptability of the product in the input image data respectively from a plurality of first discriminators by inputting the image data of each of the learning data sets respectively to the plurality of first discriminators in which an ability to determine the acceptability of the product is acquired by machine learning, and sets a difficulty level of the determination of the acceptability for each of the learning data sets in accordance with a degree to which the output values respectively acquired from the plurality of first discriminators conform to the correct answer indicated by the correct answer data; and a saving processing part that generates difficulty level data indicating a corresponding relationship between each of the learning data sets and the set difficulty level and saves the generated difficulty level data to a predetermined storage region together with the learning data group.

In addition, for example, a learning data generation device according to one aspect of the present invention includes: a learning data acquisition part that acquires a learning data group which is configured by a plurality of learning data sets respectively including a combination of image data of a product and correct answer data indicating a correct answer to determination of the acceptability of the product in the image data; a difficulty level setting part that acquires output values corresponding to a result of determining the acceptability of the product in the input image data from a first discriminator by inputting the image data of each of the learning data sets to the first discriminator in which an ability to determine the acceptability of the product is acquired by machine learning, calculates a distance between the output values acquired from the first discriminator and a decision boundary of the first discriminator for determining the acceptability of the product, and sets a difficulty level of the determination of the acceptability for each of the learning data sets in accordance with the calculated distance; and a saving processing part that generates difficulty level data indicating a corresponding relationship between each of the learning data sets and the set difficulty level and saves the generated difficulty level data to a predetermined storage region together with the learning data group.

Furthermore, the inspection system and the learning data generation device according to each embodiment described above may be applied to any scene in which a discriminator is constructed by machine learning using learning data, such as a scene in which a state of a subject in image data other than the image data of the product is determined, a scene in which a characteristic included in other types of data other than the image data is determined, or the like.

For example, a discrimination system according to one aspect of the present invention includes: a learning data acquisition part that acquires a learning data group which is configured by a plurality of learning data sets respectively including a combination of image data and correct answer data indicating a correct answer to determination of a state of a subject in the image data; a difficulty level setting part that acquires output values corresponding to a result of determining the state of the subject in the input image data respectively from a plurality of first discriminators by inputting the image data of each of the learning data sets respectively to the plurality of first discriminators in which an ability to determine the state of the subject is acquired by machine learning, and sets a difficulty level of the determination for each of the learning data sets in accordance with a degree to which the output values respectively acquired from the plurality of first discriminators conform to the correct answer indicated by the correct answer data; a learning processing part that constructs, by executing stepwise machine learning in which the learning data sets are utilized in ascending order of the set difficulty level, a second discriminator which determines the state of the subject; a target data acquisition part that acquires target image data of the subject which is a target of which the state is to be determined; and a state determination part that acquires an output value from the second discriminator by inputting the acquired target image data to the second discriminator, and determines the state of the subject in the target image data based on the output value acquired from the second discriminator.

Moreover, the "subject" may include any object that can be in the image data, for example, a face of an object person, a body of the object person, a work-piece to be worked, or the like. In addition, the "state" of the subject may include any attribute of the subject that can be determined by the discriminator. When the subject is the face, the state to be discriminated may be, for example, a type of facial expression, a position of a facial part (including organs) (including a relative position relationship between specific organs), a shape of the facial part, a color of the facial part, a state (an opening degree, an angle, or the like) of the facial part, the individual who owns the face, or the like. In addition, when the subject is the body of the object person, the state to be discriminated may be, for example, the pose of the body, and the like. When the subject is the work-piece to be worked, the state to be discriminated may be, for example, a position and orientation of the work-piece, and the like.

In addition, for example, a learning data generation device according to one aspect of the present invention includes: a learning data acquisition part that acquires a learning data group which is configured by a plurality of learning data sets respectively including a combination of image data and correct answer data indicating a correct answer to determination of a state of a subject in the image data; a difficulty level setting part that acquires output values corresponding to a result of determining the state of the subject in the input image data respectively from a plurality of first discriminators by inputting the image data of each of the learning data sets respectively to the plurality of first discriminators in which an ability to determine the state of the subject is acquired by machine learning, and sets a difficulty level of the determination for each of the learning data sets in accordance with a degree to which the output values respectively acquired from the plurality of first discriminators conform to the correct answer indicated by the correct answer data; and a saving processing part that generates difficulty level data indicating a corresponding relationship between each of the learning data sets and the set difficulty level and saves the generated difficulty level data to a predetermined storage region together with the learning data group.

In addition, for example, a discrimination system according to one aspect of the present invention includes: a learning data acquisition part that acquires a learning data group which is configured by a plurality of learning data sets respectively including a combination of image data and correct answer data indicating a correct answer to determination of a state of a subject in the image data; a difficulty level setting part that acquires output values corresponding to a result of determining the state of the subject in the input image data from a first discriminator by inputting the image data of each of the learning data sets to the first discriminator in which an ability to determine the state of the subject is acquired by machine learning, calculates a distance between the output values acquired from the first discriminator and a decision boundary of the first discriminator for determining the state of the subject, and sets a difficulty level of the determination for each of the learning data sets in accordance with the calculated distance; a learning processing part that constructs, by executing stepwise machine learning in which the learning data sets are utilized in ascending order of the set difficulty level, a second discriminator which determines the state of the subject; a target data acquisition part that acquires target image data of the subject which is a target of which the state is to be determined; and a state determination part that acquires an output value from the second discriminator by inputting the acquired target image data to the second discriminator, and determines the state of the subject in the target image data based on the output value acquired from the second discriminator.

In addition, for example, a learning data generation device according to one aspect of the present invention includes: a learning data acquisition part that acquires a learning data group which is configured by a plurality of learning data sets respectively including a combination of image data and correct answer data indicating a correct answer to determination of a state of a subject in the image data; a difficulty level setting part that acquires output values corresponding to a result of determining the state of the subject in the input image data from a first discriminator by inputting the image data of each of the learning data sets to the first discriminator in which an ability to determine the state of the subject is acquired by machine learning, calculates a distance between the output values acquired from the first discriminator and a decision boundary of the first discriminator for determining the state of the subject, and sets a difficulty level of the determination for each of the learning data sets in accordance with the calculated distance; and a saving processing part that generates difficulty level data indicating a corresponding relationship between each of the learning data sets and the set difficulty level and saves the generated difficulty level data to a predetermined storage region together with the learning data group.

In addition, for example, a discrimination system according to one aspect of the present invention includes: a learning data acquisition part that acquires a learning data group which is configured by a plurality of learning data sets respectively including a combination of a predetermined type of data and correct answer data indicating a correct answer to determination of a characteristic included in the data; a difficulty level setting part that acquires output values corresponding to a result of determining the characteristic included in the data respectively from a plurality of first discriminators by inputting the data of each of the learning data sets respectively to the plurality of first discriminators in which an ability to determine the characteristic is acquired by machine learning, and sets a difficulty level of the determination for each of the learning data sets in accordance with a degree to which the output values respectively acquired from the plurality of first discriminators conform to the correct answer indicated by the correct answer data; a learning processing part that constructs, by executing stepwise machine learning in which the learning data sets are utilized in ascending order of the set difficulty level, a second discriminator which determines the characteristic; a target data acquisition part that acquires target data including the characteristic which is a target to be determined; and a characteristic determination part that acquires an output value from the second discriminator by inputting the acquired target data to the second discriminator, and determines the characteristic included in the target data based on the output value acquired from the second discriminator.

Moreover, the predetermined type of "data" may include all types of data that can be analyzed by the discriminator, which may be, for example, in addition to the image data, sound data (voice data), numerical data, text data, data configured by a combination of these data, or the like. The "characteristic" may include all characteristics that can be discriminated from the data. When the "data" is the sound data, the "characteristic" may be, for example, whether a specific sound (for example, an abnormal noise of a machine) is included. In addition, when the "data" is numerical data or text data related to biological data such as a blood pressure and an activity amount, the "characteristic" may be, for example, a state of the object person or the like. In addition, when the "data" is numerical data or text data such as a drive amount of the machine, the "characteristic" may be, for example, a machine state or the like.

In the discrimination system according to the above aspect, the difficulty level setting part may set a lower difficulty level for the learning data sets having a higher rate at which a result matches the correct answer indicated by the correct answer data, the result being obtained by determining the characteristic based on the output values acquired from the plurality of first discriminators.

In the discrimination system according to the above aspect, the difficulty level setting part may set the difficulty level of the determination of the acceptability for each of the learning data sets in accordance with a degree to which a sum or a product of the output values respectively acquired from the plurality of first discriminators conforms to the correct answer indicated by the correct answer data.

In the discrimination system according to the above aspect, the difficulty level setting part may set a lower difficulty level for the learning data sets having a greater number of the first discriminators in which the result, which is obtained by determining the characteristic based on the output values, matches the correct answer indicated by the correct answer data at a predetermined confidence level or higher.

In the discrimination system according to the above aspect, each of the first discriminators may be constructed by machine learning using a partial data group configured by a plurality of learning data sets selected from the learning data group.

In the discrimination system according to the above aspect, the learning data acquisition part may extracts a learning data set having a specified difficulty level from the learning data group based on the difficulty level set for each of the learning data sets; collect additional data similar to the data included in the extracted learning data sets having a specified difficulty level; generate new learning data sets by giving correct answer data indicating a correct answer to determination of the characteristic included in the data to the collected additional data; and add the generated new learning data sets to the learning data group.

In addition, for example, a learning data generation device according to one aspect of the present invention includes: a learning data acquisition part that acquires a learning data group which is configured by a plurality of learning data sets respectively including a combination of a predetermined type of data and correct answer data indicating a correct answer to determination of a characteristic included in the data; a difficulty level setting part that acquires output values corresponding to a result of determining the characteristic included in the data respectively from a plurality of first discriminators by inputting the data of each of the learning data sets respectively to the plurality of first discriminators in which an ability to determine the characteristic is acquired by machine learning, and sets a difficulty level of the determination for each of the learning data sets in accordance with a degree to which the output values respectively acquired from the plurality of first discriminators conform to the correct answer indicated by the correct answer data; and a saving processing part that generates difficulty level data indicating a corresponding relationship between each of the learning data sets and the set difficulty level and saves the generated difficulty level data to a predetermined storage region together with the learning data group.

In addition, for example, a discrimination system according to one aspect of the present invention includes: a learning data acquisition part that acquires a learning data group which is configured by a plurality of learning data sets respectively including a combination of a predetermined type of data and correct answer data indicating a correct answer to determination of a characteristic included in the data; a difficulty level setting part that acquires output values corresponding to a result of determining the characteristic included in the input data from a first discriminator by inputting the data of each of the learning data sets to the first discriminator in which an ability to determine the characteristic is acquired by machine learning, calculates a distance between the output values acquired from the first discriminator and a decision boundary of the first discriminator for determining the characteristic, and sets a difficulty level of the determination for each of the learning data sets in accordance with the calculated distance; a learning processing part that constructs, by executing stepwise machine learning in which the learning data sets are utilized in ascending order of the set difficulty level, a second discriminator which determines the characteristic; a target data acquisition part that acquires target data including the characteristic which is a target to be determined; and a characteristic determination part that acquires an output value from the second discriminator by inputting the acquired target data to the second discriminator, and determines the characteristic included in the target data based on the output value acquired from the second discriminator.

In addition, for example, a learning data generation device according to one aspect of the present invention includes: a learning data acquisition part that acquires a learning data group which is configured by a plurality of learning data sets respectively including a combination of a predetermined type of data and correct answer data indicating a correct answer to determination of a characteristic included in the data; a difficulty level setting part that acquires output values corresponding to a result of determining the characteristic included in the input data from a first discriminator by inputting the data of each of the learning data sets to the first discriminator in which an ability to determine the characteristic is acquired by machine learning, calculates a distance between the output values acquired from the first discriminator and a decision boundary of the first discriminator for determining the characteristic, and sets a difficulty level of the determination for each of the learning data sets in accordance with the calculated distance; and a saving processing part that generates difficulty level data indicating a corresponding relationship between each of the learning data sets and the set difficulty level and saves the generated difficulty level data to a predetermined storage region together with the learning data group.

Moreover, as another aspect of the inspection system, the discrimination system, and the learning data generation device according to each embodiment described above, the present invention may be an information processing method or a program for realizing each configuration above, or a storage medium that stores this program and is readable by a computer and other devices, machines. Here, the computer-readable storage medium is a medium that accumulates information of the program or the like by electrical, magnetic, optical, mechanical, or chemical action.

For example, an inspection method according to one aspect of the present invention is an information processing method which inspects acceptability of a product and in which a computer executes: a step for acquiring a learning data group which is configured by a plurality of learning data sets respectively including a combination of image data of the product and correct answer data indicating a correct answer to determination of the acceptability of the product in the image data; a step for acquiring output values corresponding to a result of determining the acceptability of the product in the input image data respectively from a plurality of first discriminators by inputting the image data of each of the learning data sets respectively to the plurality of first discriminators in which an ability to determine the acceptability of the product is acquired by machine learning, and setting a difficulty level of the determination of the acceptability for each of the learning data sets in accordance with a degree to which the output values respectively acquired from the plurality of first discriminators conform to the correct answer indicated by the correct answer data; a step for constructing, by executing stepwise machine learning in which the learning data sets are utilized in ascending order of the set difficulty level, a second discriminator which determines the acceptability of the product; a step for acquiring target image data of the product which is an inspection target; and a step for acquiring an output value from the second discriminator by inputting the acquired target image data to the second discriminator, and determining the acceptability of the product in the target image data based on the output value acquired from the second discriminator.

In addition, for example, a learning data generation method according to one aspect of the present invention is an information processing method in which a computer executes: a step for acquiring a learning data group which is configured by a plurality of learning data sets respectively including a combination of image data of the product and correct answer data indicating a correct answer to determination of the acceptability of the product in the image data; a step for acquiring output values corresponding to a result of determining the acceptability of the product in the input image data respectively from a plurality of first discriminators by inputting the image data of each of the learning data sets respectively to the plurality of first discriminators in which an ability to determine the acceptability of the product is acquired by machine learning, and setting a difficulty level of the determination of the acceptability for each of the learning data sets in accordance with a degree to which the output values respectively acquired from the plurality of first discriminators conform to the correct answer indicated by the correct answer data; and a step for generating difficulty level data indicating a corresponding relationship between each of the learning data sets and the set difficulty level and saving the generated difficulty level data to a predetermined storage region together with the learning data group.

In addition, for example, an inspection method according to one aspect of the present invention is an information processing method which inspects acceptability of a product and in which a computer executes: a step for acquiring a learning data group which is configured by a plurality of learning data sets respectively including a combination of image data of the product and correct answer data indicating a correct answer to determination of the acceptability of the product in the image data; a step for acquiring output values corresponding to a result of determining the acceptability of the product in the input image data from a first discriminator by inputting the image data of each of the learning data sets to the first discriminator in which an ability to determine the acceptability of the product is acquired by machine learning, calculating a distance between the output values acquired from the first discriminator and a decision boundary of the first discriminator for determining the acceptability of the product, and setting a difficulty level of the determination of the acceptability for each of the learning data sets in accordance with the calculated distance; a step for constructing, by executing stepwise machine learning in which the learning data sets are utilized in ascending order of the set difficulty level, a second discriminator which determines the acceptability of the product; a step for acquiring target image data of the product which is an inspection target; and a step for acquiring an output value from the second discriminator by inputting the acquired target image data to the second discriminator, and determining the acceptability of the product in the target image data based on the output value acquired from the second discriminator.

In addition, for example, a learning data generation method according to one aspect of the present invention is an information processing method in which a computer executes: a step for acquiring a learning data group which is configured by a plurality of learning data sets respectively including a combination of image data of the product and correct answer data indicating a correct answer to determination of the acceptability of the product in the image data; a step for acquiring output values corresponding to a result of determining the acceptability of the product in the input image data from a first discriminator by inputting the image data of each of the learning data sets to the first discriminator in which an ability to determine the acceptability of the product is acquired by machine learning, calculating a distance between the output values acquired from the first discriminator and a decision boundary of the first discriminator for determining the acceptability of the product, and setting a difficulty level of the determination of the acceptability for each of the learning data sets in accordance with the calculated distance; and a step for generating difficulty level data indicating a corresponding relationship between each of the learning data sets and the set difficulty level and saving the generated difficulty level data to a predetermined storage region together with the learning data group.

In addition, for example, a discrimination method according to one aspect of the present invention is an information processing method in which a computer executes: a step for acquiring a learning data group which is configured by a plurality of learning data sets respectively including a combination of image data and correct answer data indicating a correct answer to determination of a state of a subject in the image data; a step for acquiring output values corresponding to a result of determining the state of the subject in the input image data respectively from a plurality of first discriminators by inputting the image data of each of the learning data sets respectively to the plurality of first discriminators in which an ability to determine the state of the subject is acquired by machine learning, and setting a difficulty level of the determination for each of the learning data sets in accordance with a degree to which the output values respectively acquired from the plurality of first discriminators conform to the correct answer indicated by the correct answer data; a step for constructing, by executing stepwise machine learning in which the learning data sets are utilized in ascending order of the set difficulty level, a second discriminator which determines the state of the subject; a step for acquiring target image data of the subject which is a target of which the state is to be determined; and a step for acquiring an output value from the second discriminator by inputting the acquired target image data to the second discriminator, and determining the state of the subject in the target image data based on the output value acquired from the second discriminator.

In addition, for example, a learning data generation method according to one aspect of the present invention is an information processing method in which a computer executes: a step for acquiring a learning data group which is configured by a plurality of learning data sets respectively including a combination of image data and correct answer data indicating a correct answer to determination of a state of a subject in the image data; a step for acquiring output values corresponding to a result of determining the state of the subject in the input image data respectively from a plurality of first discriminators by inputting the image data of each of the learning data sets respectively to the plurality of first discriminators in which an ability to determine the state of the subject is acquired by machine learning, and setting a difficulty level of the determination for each of the learning data sets in accordance with a degree to which the output values respectively acquired from the plurality of first discriminators conform to the correct answer indicated by the correct answer data; and a step for generating difficulty level data indicating a corresponding relationship between each of the learning data sets and the set difficulty level and saving the generated difficulty level data to a predetermined storage region together with the learning data group.

In addition, for example, a discrimination method according to one aspect of the present invention is an information processing method in which a computer executes: a step for acquiring a learning data group which is configured by a plurality of learning data sets respectively including a combination of image data and correct answer data indicating a correct answer to determination of a state of a subject in the image data; a step for acquiring output values corresponding to a result of determining the state of the subject in the input image data from a first discriminator by inputting the image data of each of the learning data sets to the first discriminator in which an ability to determine the state of the subject is acquired by machine learning, calculating a distance between the output values acquired from the first discriminator and a decision boundary of the first discriminator for determining the state of the subject, and setting a difficulty level of the determination for each of the learning data sets in accordance with the calculated distance; a step for constructing, by executing stepwise machine learning in which the learning data sets are utilized in ascending order of the set difficulty level, a second discriminator which determines the state of the subject; a step for acquiring target image data of the subject which is a target of which the state is to be determined; and a step for acquiring an output value from the second discriminator by inputting the acquired target image data to the second discriminator, and determining the state of the subject in the target image data based on the output value acquired from the second discriminator.

In addition, for example, a learning data generation method according to one aspect of the present invention is an information processing method in which a computer executes: a step for acquiring a learning data group which is configured by a plurality of learning data sets respectively including a combination of image data and correct answer data indicating a correct answer to determination of a state of a subject in the image data; a step for acquiring output values corresponding to a result of determining the state of the subject in the input image data from a first discriminator by inputting the image data of each of the learning data sets to the first discriminator in which an ability to determine the state of the subject is acquired by machine learning, calculating a distance between the output values acquired from the first discriminator and a decision boundary of the first discriminator for determining the state of the subject, and setting a difficulty level of the determination for each of the learning data sets in accordance with the calculated distance; a step for generating difficulty level data indicating a corresponding relationship between each of the learning data sets and the set difficulty level and saving the generated difficulty level data to a predetermined storage region together with the learning data group.

In addition, for example, a discrimination method according to one aspect of the present invention is an information processing method in which a computer executes: a step for acquiring a learning data group which is configured by a plurality of learning data sets respectively including a combination of a predetermined type of data and correct answer data indicating a correct answer to determination of a characteristic included in the data; a step for acquiring output values corresponding to a result of determining the characteristic included in the data respectively from a plurality of first discriminators by inputting the data of each of the learning data sets respectively to the plurality of first discriminators in which an ability to determine the characteristic is acquired by machine learning, and setting a difficulty level of the determination for each of the learning data sets in accordance with a degree to which the output values respectively acquired from the plurality of first discriminators conform to the correct answer indicated by the correct answer data; a step for constructing, by executing stepwise machine learning in which the learning data sets are utilized in ascending order of the set difficulty level, a second discriminator which determines the characteristic; a step for acquiring target data including the characteristic which is a target to be determined; and a step for acquiring an output value from the second discriminator by inputting the acquired target data to the second discriminator, and determining the characteristic included in the target data based on the output value acquired from the second discriminator.

In addition, for example, a learning data generation method according to one aspect of the present invention is an information processing method in which a computer executes: a step for acquiring a learning data group which is configured by a plurality of learning data sets respectively including a combination of a predetermined type of data and correct answer data indicating a correct answer to determination of a characteristic included in the data; a step for acquiring output values corresponding to a result of determining the characteristic included in the data respectively from a plurality of first discriminators by inputting the data of each of the learning data sets respectively to the plurality of first discriminators in which an ability to determine the characteristic is acquired by machine learning, and setting a difficulty level of the determination for each of the learning data sets in accordance with a degree to which the output values respectively acquired from the plurality of first discriminators conform to the correct answer indicated by the correct answer data; and a step for generating difficulty level data indicating a corresponding relationship between each of the learning data sets and the set difficulty level and saving the generated difficulty level data to a predetermined storage region together with the learning data group.

In addition, for example, a discrimination method according to one aspect of the present invention is an information processing method in which a computer executes: a step for acquiring a learning data group which is configured by a plurality of learning data sets respectively including a combination of a predetermined type of data and correct answer data indicating a correct answer to determination of a characteristic included in the data; a step for acquiring output values corresponding to a result of determining the characteristic included in the input data from a first discriminator by inputting the data of each of the learning data sets to the first discriminator in which an ability to determine the characteristic is acquired by machine learning, calculating a distance between the output values acquired from the first discriminator and a decision boundary of the first discriminator for determining the characteristic, and setting a difficulty level of the determination for each of the learning data sets in accordance with the calculated distance; a step for constructing, by executing stepwise machine learning in which the learning data sets are utilized in ascending order of the set difficulty level, a second discriminator which determines the characteristic; a step for acquiring target data including the characteristic which is a target to be determined; and a step for acquiring an output value from the second discriminator by inputting the acquired target data to the second discriminator, and determining the characteristic included in the target data based on the output value acquired from the second discriminator.

In addition, for example, according to one aspect of the present invention learning data generation method is an information processing method in which a computer executes: a step for acquiring a learning data group which is configured by a plurality of learning data sets respectively including a combination of a predetermined type of data and correct answer data indicating a correct answer to determination of a characteristic included in the data; a step for acquiring output values corresponding to a result of determining the characteristic included in the input data from a first discriminator by inputting the data of each of the learning data sets to the first discriminator in which an ability to determine the characteristic is acquired by machine learning, calculating a distance between the output values acquired from the first discriminator and a decision boundary of the first discriminator for determining the characteristic, and setting a difficulty level of the determination for each of the learning data sets in accordance with the calculated distance; and a step for generating difficulty level data indicating a corresponding relationship between each of the learning data sets and the set difficulty level and saving the generated difficulty level data to a predetermined storage region together with the learning data group.

Effect

According to the present invention, a technique can be provided which can determine a characteristic in data with relatively high precision.

DESCRIPTION OF THE EMBODIMENTS

Hereinafter, an embodiment according to one aspect of the present invention (hereinafter, also referred to as "the embodiment") is described with reference to the drawings. However, the embodiment described below is merely an example of the present invention in all aspects. It is evident that various improvements or modifications can be made without departing from the scope of the present invention. That is, in implementing the present invention, a specific configuration according to the embodiment may be appropriately employed. Moreover, although the data that appears in the embodiment is described in natural language, more specifically, the data is specified by a computer-recognizable pseudo language, command, parameter, machine language, or the like.

§ 1 Application Example

First, an example of a basic configuration of the present invention is described. When a discriminator is constructed by machine learning using learning data sets, the following problems may occur. That is, when machine learning is performed using many learning data sets at once, there is a possibility that a discriminator having high generalization ability cannot be constructed due to a reason of falling into a local solution that determines a characteristic that appears in a learning data group or the like. Thereby, even if learning data sets of a sufficient number to perform the machine learning are prepared, there is a possibility that in the discriminator constructed by the prepared learning data sets, a characteristic included in the target data cannot be determined with relatively high precision.

Therefore, in an example of the present invention, a learning data group is acquired which is configured by a plurality of learning data sets respectively including a combination of a predetermined type of data and correct answer data indicating a correct answer to determination of a characteristic included in the predetermined type of data. Next, one or more first discriminators which have been machine-learned in advance for the ability to determine the characteristic are used to set a difficulty level of the determination for each of the learning data sets. Then, a second discriminator which acquires the ability of determining the characteristic is constructed by performing stepwise machine learning in which the learning data sets are utilized in ascending order of the set difficulty level.

Thereby, in an example of the present invention, in a process of machine learning, falling into the local solution that determines the characteristic appearing in the learning data sets can be difficult, and the machine learning that effectively uses the prepared learning data group can be performed. Thus, according to the example of the present invention, the characteristic included in the target data can be determine with relatively high precision by the second discriminator constructed in this way.

Figure 1:
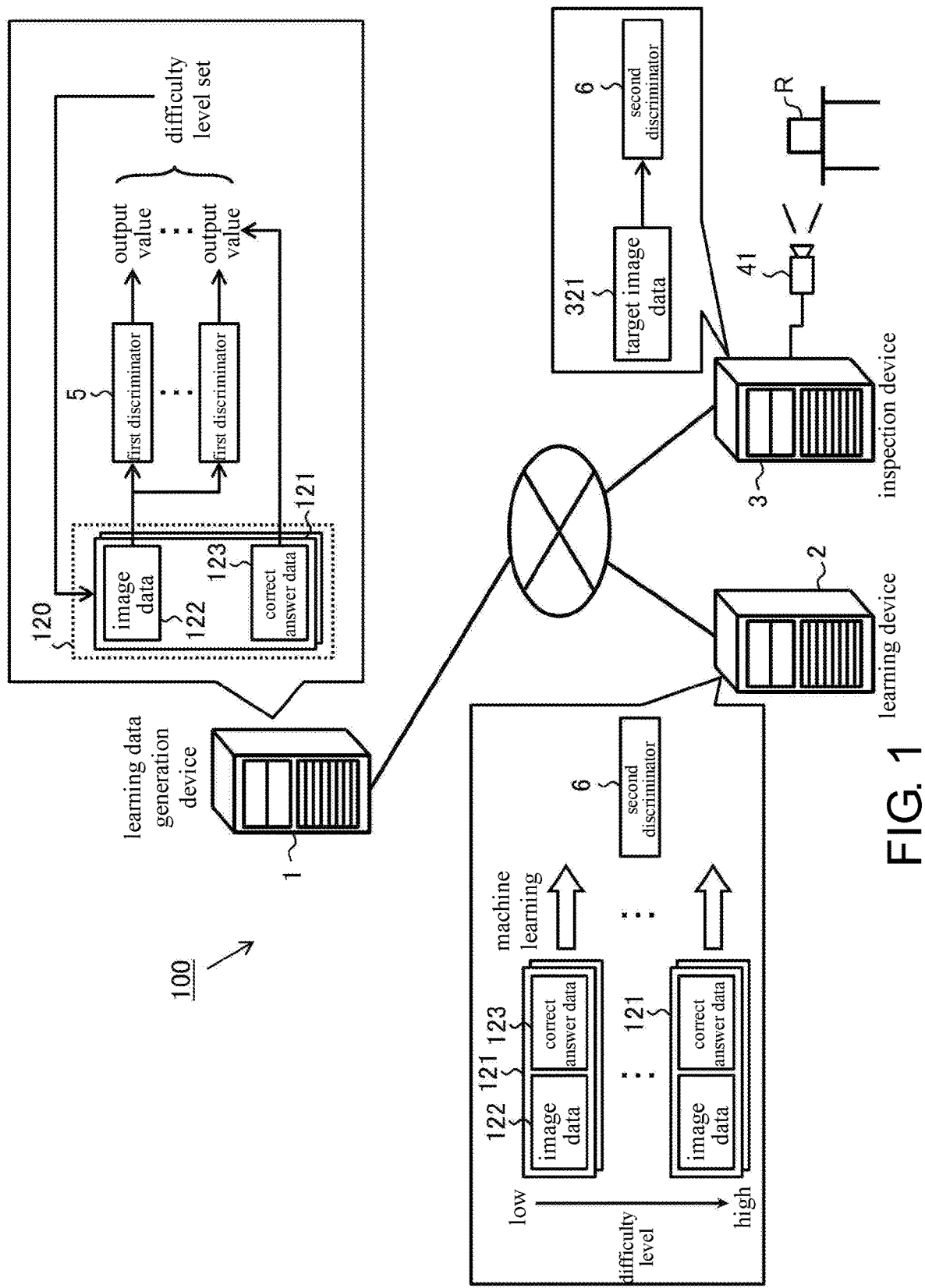
FIG. 1 schematically illustrates an example of a scene in which the present invention is applied.

Next, an example of a scene in which the present invention is applied is described with reference to FIG. 1. FIG. 1 schematically illustrates an example of a scene in which the present invention is applied to a visual inspection of a product. However, the application range of the present invention is not limited to the example of the visual inspection described below. The present invention can be applied to all scenes in which a discriminator is constructed by machine learning using the learning data sets.

An inspection system 100 illustrated in FIG. 1 includes a learning data generation device 1, a learning data generation device 1, a learning device 2, and an inspection device 3 which are connected via a network, and is configured to inspect the acceptability of the product. A type of the network among the learning data generation device 1, the learning device 2, and the inspection device 3 may be appropriately selected from, for example, Internet, a wireless communication network, a mobile communication network, a telephone network, a dedicated network, and the like.

Moreover, in the example of FIG. 1, the learning data generation device 1, the learning device 2, and the inspection device 3 are separate computers. However, the configuration of the inspection system 100 may not be limited to this example. At least one pair of the learning data generation device 1, the learning device 2, and the inspection device 3 may be an integrated computer. In addition, the learning data generation device 1, the learning device 2, and the inspection device 3 may be respectively configured by a plurality of computers.

The learning data generation device 1 according to the embodiment is a computer configured to generate learning data sets in which the difficulty level of the determination is set. specifically, first, the learning data generation device 1 acquires a learning data group which is configured by a plurality of the learning data sets 121 respectively including a combination of image data 122 of the product and correct answer data 123 indicating a correct answer to determination of acceptability of the product in the image data 12.

Next, the learning data generation device 1 inputs the image data 122 of each of the learning data sets 121 respectively to a plurality of first discriminators 5 which has acquired an ability of determining the acceptability of the product by machine learning. In the embodiment, the plurality of first discriminators 5 are respectively constructed by machine learning under different learning conditions. Thereby, the learning data generation device 1 acquires output values corresponding to a result of determining the acceptability of the product in the input image data 122 from each first discriminator 5.

Then, the learning data generation device 1 sets a difficulty level of the determination of the acceptability for each of the learning data sets 121 in accordance with a degree to which the output values acquired from each first discriminator 5 conform to the correct answer indicated by the correct answer data 123. Specifically, the learning data generation device 1 sets the difficulty level of the corresponding learning data sets 121 low as the acceptability can be correctly determined by each first discriminator 5, and the learning data generation device 1 sets the difficulty level of the corresponding learning data sets 121 high as the acceptability cannot be correctly determined by each first discriminator 5.

On the other hand, the learning device 2 according to the embodiment is a computer which uses the learning data sets 121 in which the difficulty level is set to generate a second discriminator 6 which determines the acceptability of the product. Specifically, the learning device 2 constructs the second discriminator 6 which determines the acceptability of the product by performing stepwise machine learning in which the learning data sets 121 are utilized in ascending order of the set difficulty level.

In addition, the inspection device 3 according to the embodiment is a computer which uses the constructed second discriminator 6 to perform visual inspection of the product R. Specifically, first, the inspection device 3 acquires target image data 321 of the product R which is an inspection target. In the embodiment, the inspection device 3 is connected to a camera 41 and acquires the target image data 321 by photographing the product R using the camera 41.

Next, the inspection device 3 acquires an output value from the second discriminator 6 by inputting the acquired target image data 321 to the second discriminator 6. Then, the inspection device 3 determines the acceptability of the product R in the target image data 321 based on the output value acquired from the second discriminator 6. Thereby, the inspection device 3 performs the visual inspection of the product R.

As described above, in the inspection system 100 according to the embodiment, the plurality of first discriminators 5 that has acquired the determination of the acceptability of the product is used to set the difficulty level of the determination of the acceptability for each of the learning data sets 121 included in a learning data group 120. Particularly, in the embodiment, the plurality of first discriminators 5 which is constructed by the machine learning under different learning conditions is used to set the difficulty level of the determination of the acceptability for each of the learning data sets 121. The determination of acceptability with respect to the low difficulty-level learning data sets 121 tends to be difficult to make an error, on the other hand, the determination of acceptability with respect to high difficulty-level learning data sets 121 tends to be easy to make an error. Therefore, even if determination performance of each first discriminator 5 is not excellent, the difficulty level of each of the learning data sets 121 can appropriately set by the determination using each first discriminator 5 above.

Then, in the embodiment, the second discriminator 6 which determines the acceptability of the product is constructed by performing the stepwise machine learning in which the learning data sets 121 are utilized in ascending order of the set difficulty level. Accordingly, first, by the machine learning using the low difficulty-level learning data sets 121, the second discriminator 6 can acquire an overall tendency of the determination of the acceptability appear in the learning data group 120. Thereafter, by machine learning using the high difficulty-level learning data sets 121, the second discriminator 6 can acquire a tendency of the determination of the acceptability appear in the learning data group 120.

Thus, according to the embodiment, in the process of the machine learning, it can be difficult to fall into a local solution for determining the acceptability of the product appears in the learning data group 120, and the machine learning that effectively uses the prepared learning data group 120 can be performed. That is, the second discriminator 6 having a relatively high generalization performance that can be achieved by the prepared learning data group 120 can be constructed. Therefore, in the inspection device 3 according to the embodiment, the acceptability of the product R in the target image data 321 can be determined with relatively high precision by the second discriminator 6 constructed in this way.

Moreover, the product R which is the target of the visual inspection may not be particularly limited and may be appropriately selected according to the embodiment. The product R may be, for example, a product transported on a production line for electronic parts, automobile parts, or the like. The electronic parts are, for example, substrates, chip capacitors, liquid crystals, relay windings, and the like. The automobile parts are, for example, connecting rods, shafts, engine blocks, power window switches, panels, and the like. In addition, the determination of the acceptability may be simple determination on whether the product R has defects, or may include, in addition to the determination on whether the product R has defects, discrimination for the type of the defects. The defects are, for example, scratches, dirt, cracks, dents, dust, burrs, colour unevenness, and the like.

§ 2 Configuration Example

Hardware Configuration

Learning Data Generation Device

Figure 2:
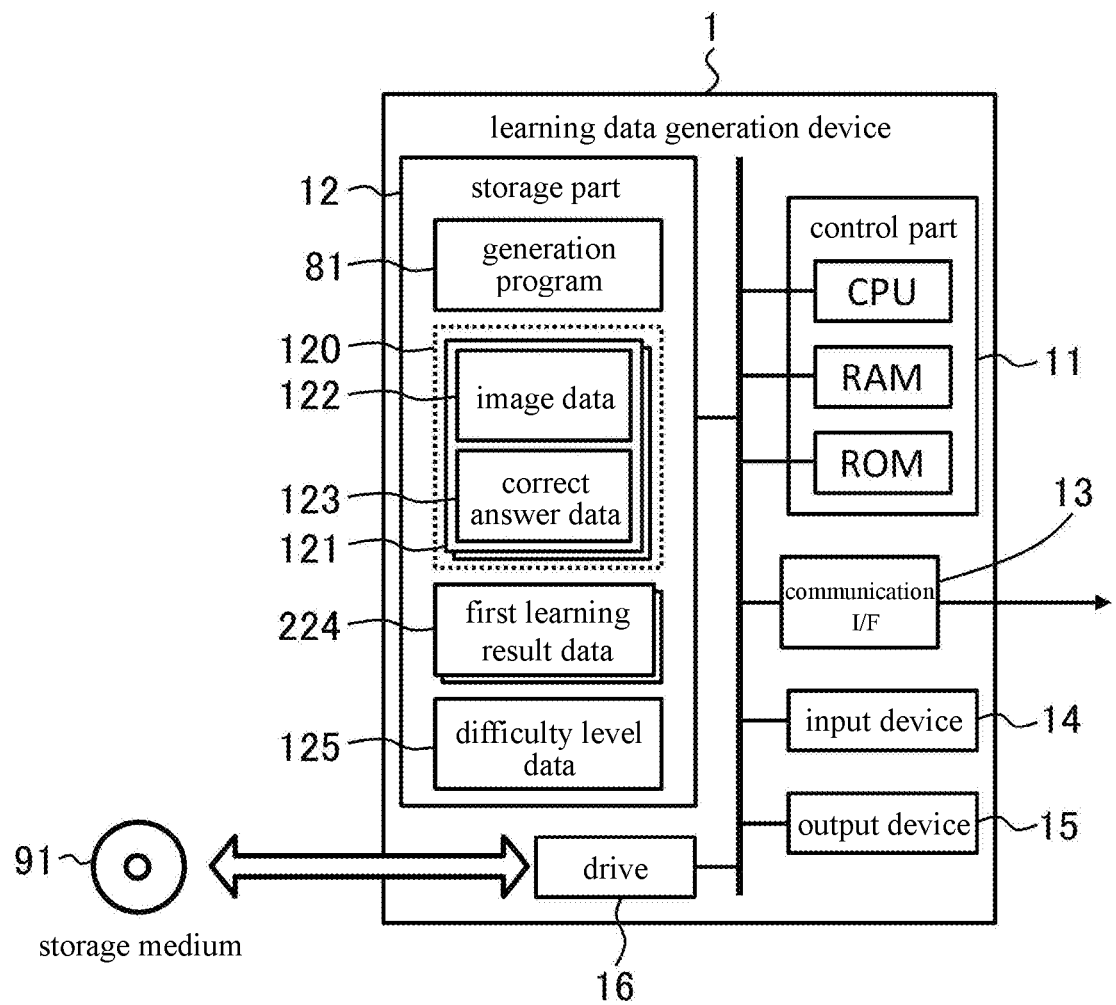
FIG. 2 schematically illustrates an example of a hardware configuration of a learning data generation device according to an embodiment.

Next, an example of a hardware configuration of the learning data generation device 1 according to the embodiment is described with reference to FIG. 2. FIG. 2 schematically illustrates the example of the hardware configuration of the learning data generation device 1 according to the embodiment.

As described in FIG. 2, the learning data generation device 1 according to the embodiment is a computer in which a control part 11, a storage part 12, a communication interface 13, an input device 14, an output device 15, and a drive 16 are electrically connected. Moreover, in FIG. 2, the communication interface is described as "communication I/F".

The control part 11 includes a CPU (Central Processing Unit) that is a hardware processor, a RAM (Random Access Memory), a ROM (Read Only Memory), and the like, and is configured to execute information processing based on a program and various data. The storage part 12 is an example of a memory and is configured by, for example, a hard disk drive, a solid state drive, and the like. In the embodiment, the storage part 12 stores various information such as a generation program 81, the learning data group 120, a plurality of pieces of first learning result data 224, difficulty level data 125, and the like.

The generation program 81 is a program for making the learning data generation device 1 perform information processing described later (FIG. 9 and FIG. 12) for generating the learning data group 120 in which the difficulty level of the determination of the acceptability is set for each of the learning data sets 121, and includes a series of instructions for the information processing. The learning data group 120 is used for the machine learning of the second discriminator 6 and is configured by the plurality of learning data sets 121. Each of the learning data sets 121 includes the combination of the image data 122 of the product and the correct answer data 123 indicating the correct answer to the determination of the acceptability of the product in the image data 12. Each piece of the first learning result data 224 is data for setting the trained first discriminators 5. The difficulty level data 125 indicates a corresponding relationship between each of the learning data sets 121 and the difficulty level set by the information processing described later. Details will be described later.

The communication interface 13 is, for example, a wired LAN (Local Area Network) module, a wireless LAN module, or the like, and is an interface for performing wired or wireless communication via a network. The learning data generation device 1 can use the communication interface 13 to perform data communication via the network with another information processing device (for example, the learning device 2).

The input device 14 is, for example, a device for input, such as a mouse, a keyboard, or the like. In addition, the output device 15 is, for example, a device for output, such as a display, a speaker, or the like. An operator can use the input device 14 and the output device 15 to operate the learning data generation device 1.

The drive 16 is, for example, a CD drive, a DVD drive, or the like, and is a drive device for reading a program stored in a storage medium 91. A type of the drive 16 may be appropriately selected according to a type of the storage medium 91. At least one of the generation program 81, the learning data group 120, and the plurality of pieces of first learning result data 224 may be stored in the storage medium 91.

The storage medium 91 is a medium that accumulates information such as a program or the like by electrical, magnetic, optical, mechanical, or chemical action in a manner that a computer and other devices, machines and the like can read the information such as a recorded program. The learning data generation device 1 may acquire, from the storage medium 91, at least one of the generation program 81, the learning data group 120, and the plurality of pieces of first learning result data 224.

Here, in FIG. 2, a disk-type storage medium such as a CD, a DVD, or the like is illustrated as an example of the storage medium 91. However, the type of the storage medium 91 is not limited to the disk type, and may be a type other than the disk type. The storage medium other than the disk type may be, for example, a semiconductor memory such as a flash memory or the like.

Moreover, regarding the specific hardware configuration of the learning data generation device 1, omission, replacement, and addition of the constituent elements can be appropriately made according to the embodiment. For example, the control part 11 may include a plurality of hardware processors. The hardware processor may be configured by a microprocessor, a FPGA (field-programmable gate array), a DSP (digital signal processor), and the like. The storage part 12 may be configured by the RAM and the ROM included in the control part 11. At least one of the communication interface 13, the input device 14, the output device 15, and the drive 16 may be omitted. The learning data generation device 1 may be configured by a plurality of computers. In this case, the hardware configurations of each computer may match each other or may not. In addition, the learning data generation device 1 may be, in addition to an information processing device designed exclusively for the provided service, a general-purpose server device, a PC (Personal Computer), or the like.

Learning Device

Figure 3:
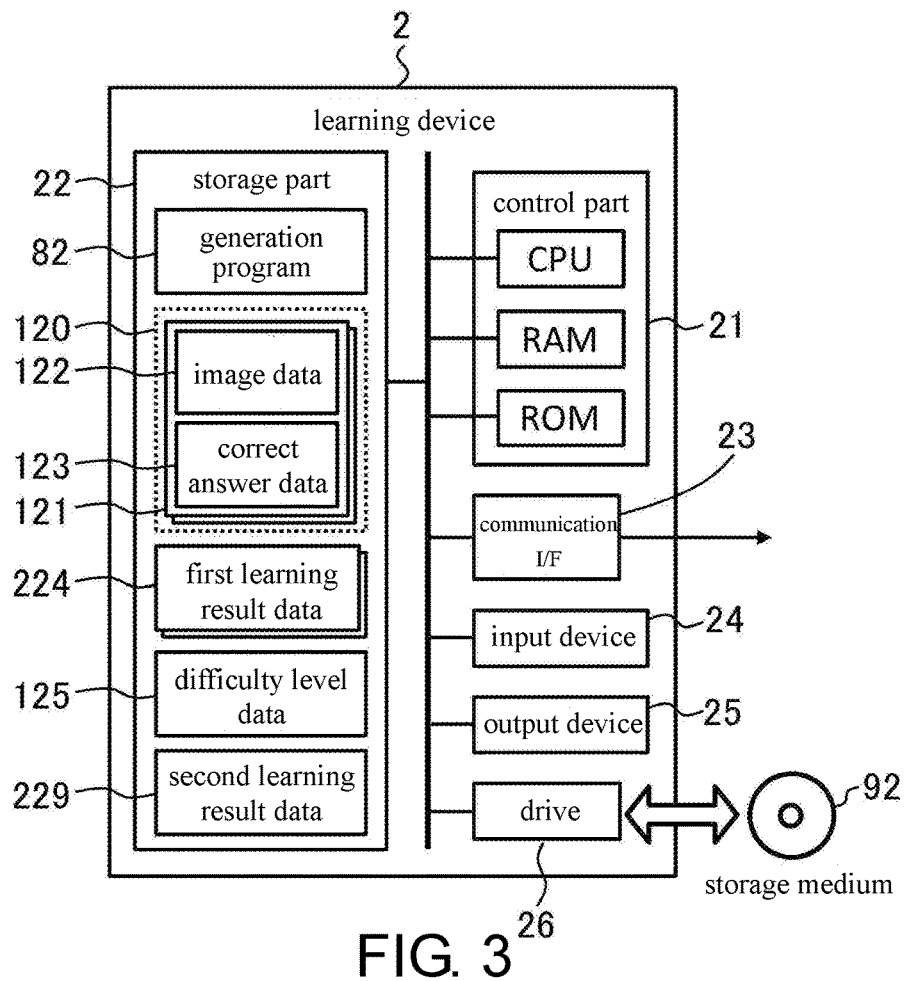
FIG. 3 schematically illustrates an example of a hardware configuration of a learning device according to the embodiment.

Next, an example of a hardware configuration of the learning device 2 according to the embodiment is described with reference to FIG. 3. FIG. 3 schematically illustrates the example of the hardware configuration of the learning device 2 according to the embodiment.

As described in FIG. 3, the learning device 2 according to the embodiment is a computer in which a control part 21, a storage part 22, a communication interface 23, an input device 24, an output device 25, and a drive 26 are electrically connected. Moreover, in FIG. 3, similarly with FIG. 2, the communication interface is described as "communication I/F".

The learning device 2 has similar configuration with the learning data generation device 1. The control part 21 includes a CPU that is a hardware processor, a RAM, a ROM and the like, and is configured to execute various information processing based on a program and data. The storage part 22 is configured by, for example, a hard disk drive, a solid state drive, and the like. The storage part 22 stores various information such as a learning program 82, the learning data group 120, the plurality of pieces of first learning result data 224, the difficulty level data 125, second learning result data 229, and the like.

The learning program 82 is a program for making the learning device 2 perform information processing of machine learning described later (FIG. 8, FIG. 10) for constructing each first discriminator 5 and the second discriminator 6 and for generating the first learning result data 224 and the second learning result data 229 as a result. The second learning result data 229 is data for setting the trained second discriminator 6. Details will be described later.

The communication interface 23 is, for example, a wired LAN module, a wireless LAN module, or the like, and is an interface for performing wired or wireless communication via a network. The learning device 2 can use the communication interface 23 to perform data communication via the network with another information processing device (for example, the learning data generation device 1 and the inspection device 3).

The input device 24 is, for example, a device for input, such as a mouse, a keyboard, or the like. In addition, the output device 25 is, for example, a device for output, such as a display, a speaker, or the like. The operator can use the input device 24 and the output device 25 to operate the learning device 2.

The drive 26 is, for example, a CD drive, a DVD drive, or the like, and is a drive device for reading a program stored in a storage medium 92. The drive 26 and the storage medium 91 are respectively configured similarly with the drive 16 and the storage medium 91. At least one of the learning program 82, the learning data group 120, and the difficulty level data 125 may be stored in the storage medium 92. In addition, the learning device 2 may acquire, from the storage medium 92, at least one of the learning program 82, the learning data group 120, and the difficulty level data 125.

Moreover, regarding the specific hardware configuration of the learning device 2, omission, replacement, and addition of the constituent elements can be appropriately made according to the embodiment. For example, the control part 21 may include a plurality of hardware processors. The hardware processor may be configured by a microprocessor, a FPGA, a DSP, and the like. The storage part 22 may be configured by the RAM and the ROM included in the control part 21. At least one of the communication interface 23, the input device 24, the output device 25 and the drive 26 may be omitted. The learning device 2 may be configured by a plurality of computers. In this case, the hardware configurations of each computer may match each other or may not. In addition, the learning device 2 may be, in addition to an information processing device designed exclusively for the provided service, a general-purpose server device, a general-purpose PC, or the like.

Inspection Device

Figure 4:
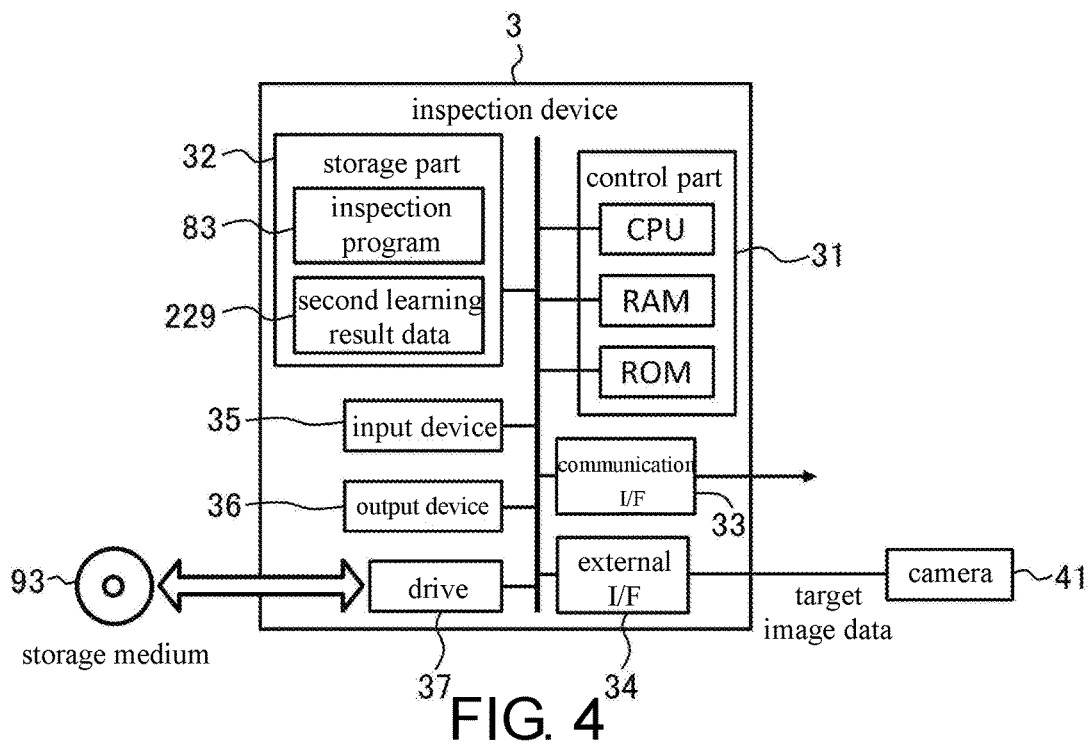
FIG. 4 schematically illustrates an example of a hardware configuration of an inspection device according to the embodiment.

Next, an example of a hardware configuration of the inspection device 3 according to the embodiment is described with reference to FIG. 4. FIG. 4 schematically illustrates the example of the hardware configuration of the inspection device 3 according to the embodiment.

As described in FIG. 4, the inspection device 3 according to the embodiment is a computer in which a control part 31, a storage part 32, a communication interface 33, an external interface 34, an input device 35, an output device 36, and a drive 37 are electrically connected. Moreover, in FIG. 4, the communication interface and the external interface are respectively described as "the communication I/F" and "the external I/F".

The inspection device 3 has a similar configuration as the learning data generation device 1 and the learning device 2 except that the inspection device 3 includes the external interface 34. The control part 31 includes a CPU that is a hardware processor, a RAM, a ROM and the like, and is configured to execute various information processing based on a program and data. The storage part 32 is configured by, for example, a hard disk drive, a solid state drive, and the like. The storage part 32 stores various information such as an inspection program 83, the second learning result data 229, and the like.

The inspection program 83 is a program which makes the inspection device 3 perform information processing described later (FIG. 11) for determining the acceptability of the product R in the target image data 321 using the second discriminator 6, and includes a series of instructions for the information processing. Details will be described later.

The communication interface 33 is, for example, a wired LAN module, a wireless LAN module, or the like, and is an interface for performing wired or wireless communication via a network. The inspection device 3 can use the communication interface 33 to perform data communication via the network with another information processing device (for example, the learning device 2).

The external interface 34 is, for example, a USB (Universal Serial Bus) port, a dedicated port, or the like, and is an interface for connecting to an external device. A type and the number of the external interfaces 34 may be appropriately selected according to a type and the number of the external device to be connected. In the embodiment, the inspection device 3 is connected to the camera 41 via the external interface 34.

The camera 41 is used to acquire the target image data 321 by photographing the product R. A type and a location of the camera 41 may not be particularly limited and may be appropriately determined according to the embodiment. As the camera 41, for example, a known camera such as a digital camera, a video camera, or the like may be used. In addition, the camera 41 may be arranged in the vicinity of a production line where the product R is transported. Moreover, when the camera 41 has a communication interface, the inspection device 3 may be connected to the camera 41 via the communication interface 33 instead of the external interface 34.

The input device 35 is, for example, a device for input, such as a mouse, a keyboard, or the like. In addition, the output device 36 is, for example, a device for output, such as a display, a speaker, or the like. The operator can use the input device 35 and the output device 36 to operate the inspection device 3.

The drive 37 is, for example, a CD drive, a DVD drive, or the like, and is a drive device for reading a program stored in a storage medium 93. The drive 37 and the storage medium 93 are respectively configured similarly with the drive 16 and the storage medium 91. At least one of the inspection program 83 and the second learning result data 229 may be stored in the storage medium 93. In addition, the inspection device 3 may acquire, from the storage medium 93, at least one of the inspection program 83 and the second learning result data 229.

Moreover, regarding the specific hardware configuration of the inspection device 3, omission, replacement, and addition of the constituent elements can be appropriately made according to the embodiment similarly to the learning data generation device 1 and the learning device 2. For example, the control part 31 may include a plurality of hardware processors. The hardware processor may be configured by a microprocessor, a FPGA, a DSP, and the like. The storage part 32 may be configured by the RAM and the ROM included in the control part 31. At least one of the communication interface 33, the external interface 34, the input device 35, the output device 36 and the drive 37 may be omitted. The inspection device 3 may be configured by a plurality of computers. In this case, the hardware configurations of each computer may match each other or may not. In addition, the inspection device 3 may use, in addition to an information processing device designed exclusively for the provided service, a general-purpose server device, a general-purpose desktop PC, a notebook PC, a tablet PC, a mobile phone including a smartphone, or the like.

Software Configuration

Learning Data Generation Device

Figure 5:
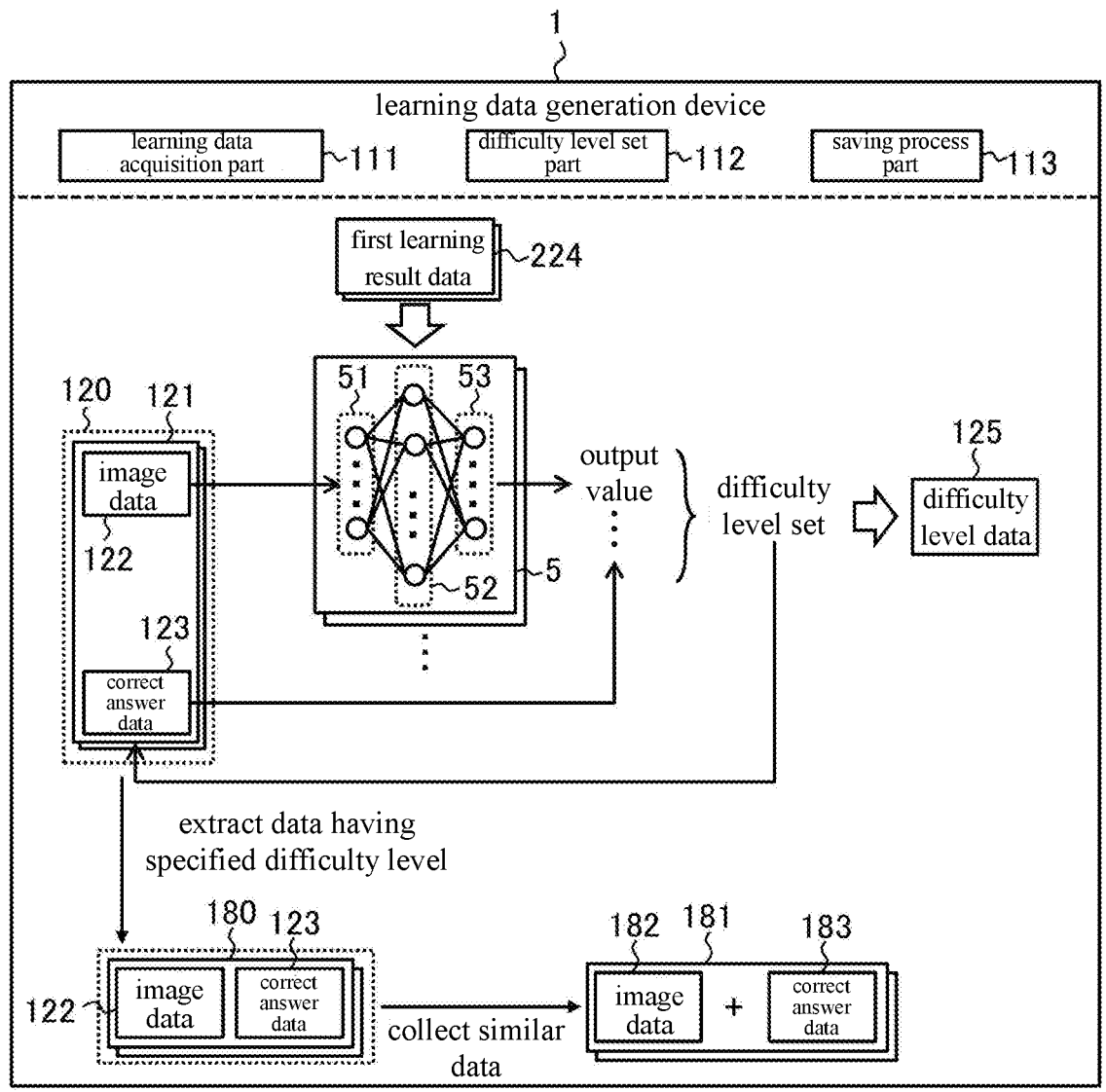
FIG. 5 schematically illustrates an example of a software configuration of the learning data generation device according to the embodiment.

Next, an example of a software configuration of the learning data generation device 1 according to the embodiment is described with reference to FIG. 5. FIG. 5 schematically illustrates the example of the software configuration of the learning data generation device 1 according to the embodiment.

The control part 11 of the learning data generation device 1 expands the generation program 81 stored in the storage part 12 into the RAM. Then, the control part 11 interprets and executes the generation program 81 expanded into the RAM by the CPU to control each constituent element. Accordingly, as described in FIG. 5, the learning data generation device 1 according to the embodiment operates as a computer which includes, as software modules, a learning data acquisition part 111, a difficulty level setting part 112, and a saving processing part 113. That is, in the embodiment, each software module is realized by the control part 11 (CPU).

The learning data acquisition part 111 acquires the learning data group 120 which is configured by the plurality of learning data sets 121 including the combination of the image data 122 of the product and the correct answer data 123 indicating the correct answer to the determination of the acceptability of the product in the image data 122.

The difficulty level setting part 112 includes the plurality of first discriminators 5 which has acquired the ability of determining the acceptability of the product by the machine learning. The difficulty level setting part 112 acquires the output values corresponding to the result of determining the acceptability of the product in the input image data 122 from each first discriminator 5 by inputting the image data 122 of each of the learning data sets 121 to each first discriminator 5. Then, the difficulty level setting part 112 sets the difficulty level of the determination of the acceptability for each of the learning data sets 121 in accordance with the degree to which the output values acquired from each first discriminator 5 conform to the correct answer indicated by the correct answer data 123. Moreover, in the embodiment, the plurality of first discriminators 5 are respectively constructed by the machine learning under different learning conditions. However, the plurality of first discriminators 5 included in the difficulty level setting part 112 may not be limited to this example. At least one pair of the plurality of first discriminators 5 included in the difficulty level setting part 112 may be constructed by machine learning under the same learning condition.

The saving processing part 113 generates the difficulty level data 125 indicating the corresponding relationship between each of the learning data sets 121 and the set difficulty level. Then, the saving processing part 113 saves the generated difficulty level data 125 in a predetermined storage region (for example, the storage part 12) together with the learning data group 120.

In addition, the learning data acquisition part 111 extracts learning data sets 180 having a specified difficulty level from the learning data group 120 based on the difficulty level set for each of the learning data sets 121. Next, the learning data acquisition part 111 collects additional image data 182 similar to the image data 122 included in the extracted learning data sets 180 having the specified difficulty level. Then, the learning data acquisition part 111 generates new learning data sets 181 by giving correct answer data 183 indicating a correct answer to determination of acceptability of a product in the additional image data 182 to the collected the additional image data 182. Then, the learning data acquisition part 111 adds the generated new learning data sets 181 to the learning data group 120.

Discriminator

Next, a configuration of each first discriminator 5 is described. As described in FIG. 5, the first discriminator 5 according to the embodiment is configured by a neural network. Specifically, the first discriminator 5 is configured by a neural network having a multilayer structure used for so-called deep learning, and includes an input layer 51, an intermediate layer (hidden layer) 52, and an output layer 53.

Moreover, in the example of FIG. 5, the neural network configuring the first discriminator 5 includes one intermediate layer 52, and output of the input layer 51 is input to the intermediate layer 52, and output of the intermediate layer 52 is input to the output layer 53. However, the number of the intermediate layer 52 may not be limited to one. The first discriminator 5 may include two or more intermediate layers 52.

Each of the layers 51 to 53 includes one or more neurons. For example, the number of neurons in the input layer 51 may be set according to the image data 122. The number of neurons in the intermediate layer 52 may be set appropriately according to the embodiment. In addition, the number of neurons in the output layer 53 may be set according to the number of the types of the correct answer indicated by the correct answer data 123.

Neurons in adjacent layers are appropriately coupled to each other, and a weight (a coupling load) is set for each coupling. In the example of FIG. 5, each neuron is coupled to all the neurons in the adjacent layers. However, the coupling of the neurons may not be limited to this example and may be set appropriately according to the embodiment.

A threshold value is set for each neuron and basically, the output of each neuron is determined depending on whether a sum of products of each input and each weight exceeds the threshold value. The difficulty level setting part 112 inputs the image data 122 to the input layer 51 of each first discriminator 5 and sequentially performs ignition determination of each neuron included in each layer from the input side as a calculation process of the neural network. Thereby, the difficulty level setting part 112 acquires, from the output layer 53, the output value corresponding to the result of determining the acceptability of the product in the input image data 122.

Moreover, information indicating a configuration of each first discriminator 5 (neural network) (for example, the number of the layers of the neural network, the number of the neurons in each layer, the coupling relationship between the neurons, a transfer function of each neuron), the coupling weight between the neurons, and the threshold value of each neuron is included in each piece of the first learning result data 224. The difficulty level setting part 112 refers to each piece of the first learning result data 224 to set each first discriminator 5 used for the determination of the difficulty level.

Learning Device

Figure 6:
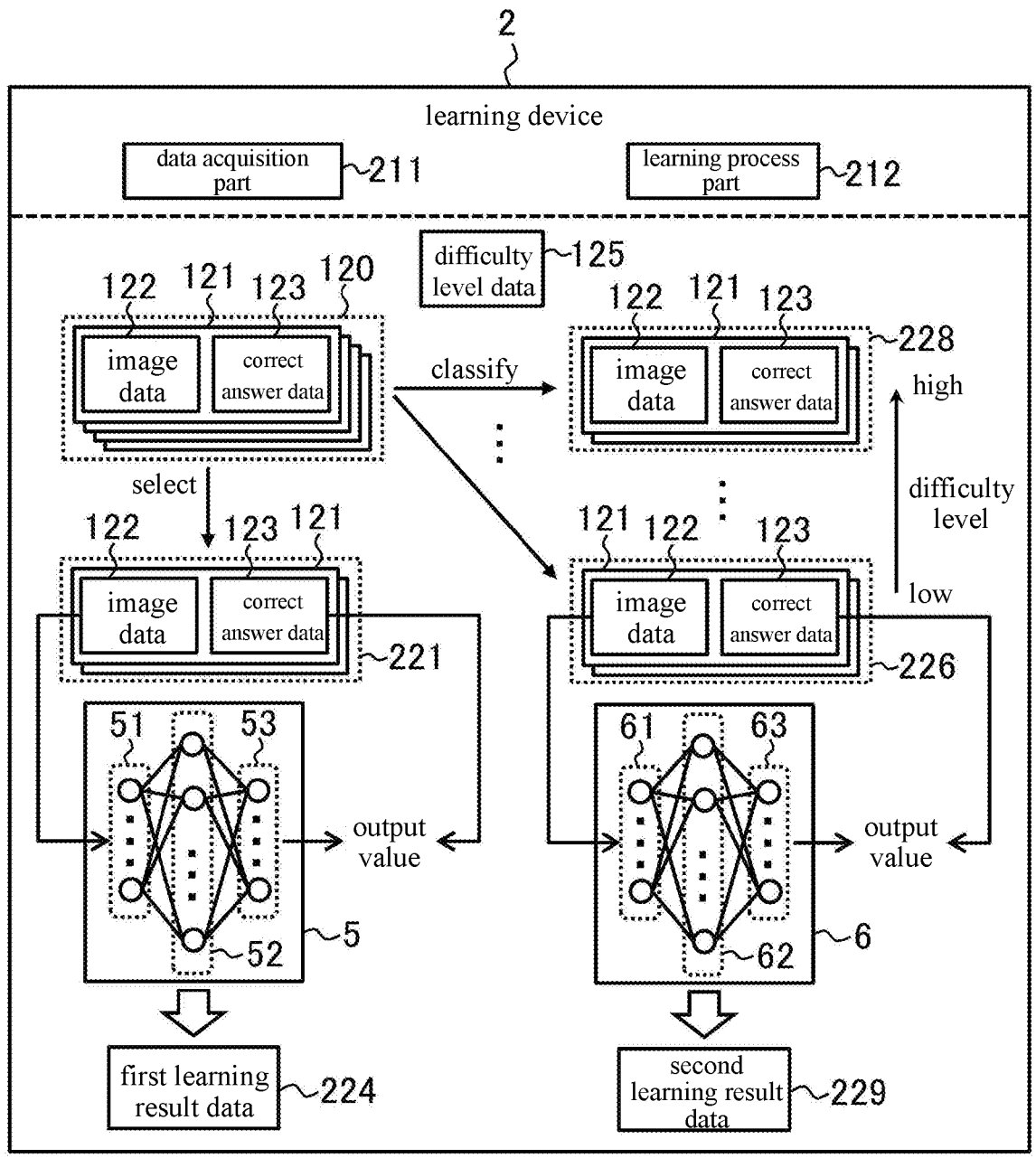
FIG. 6 schematically illustrates an example of a software configuration of the learning device according to the embodiment.

Next, an example of a software configuration of the learning device 2 according to the embodiment is described with reference to FIG. 6. FIG. 6 schematically illustrates the example of the software configuration of the learning device 2 according to the embodiment.

The control part 21 of the learning device 2 expands the learning program 82 stored in the storage part 22 into the RAM. Then, the control part 21 interprets and executes the learning program 82 expanded into the RAM by the CPU to control each constituent element. Accordingly, as described in FIG. 6, the learning device 2 according to the embodiment is configured as a computer which includes a data acquisition part 211 and a learning processing part 212 as software modules. That is, in the embodiment, each software module is realized by the control part 21 (CPU).

The data acquisition part 211 acquires the learning data group 120 which is used for the machine learning. The learning processing part 212 uses the plurality of learning data sets 121 included in the learning data group 120 to perform the machine learning of the discriminator.

In the embodiment, the learning processing part 212 selects the plurality of learning data sets 121 from the learning data group 120, and thereby creating a partial data group 221 configured by the selected plurality of learning data sets 121. Then, the learning processing part 212 uses the partial data group 221 to perform the machine learning of the first discriminator 5. That is, for each of the learning data sets 121 included in the partial data group 221, when the image data 122 is input to the input layer 51, the learning processing part 212 performs the machine learning of the first discriminator 5 in a manner that the output value corresponding to the correct answer data 123 associated with the input image data 122 is output from the output layer 53.

Thereby, the learning processing part 212 construct the trained first discriminator 5. Then, the learning processing part 212 stores, in the storage part 22, information indicating the configuration of the trained first discriminator 5, the coupling weight between the neurons, and the threshold value of each neuron as the first learning result data 224. Moreover, in the above machine learning, the learning conditions can be made different by changing at least one of parameters of the neural network and the learning data sets 121 configuring the partial data group 221. The learning processing part 212 can construct a plurality of first discriminators 5 that have been machine-learned under different learning conditions by changing the learning conditions and repeating the series of processes. On the other hand, the learning processing part 212 can construct two or more first discriminators 5 that have been machine-learned under the same learning condition by repeating the series of processes without changing the learning condition.

In addition, the learning processing part 212 uses the learning data group 120 to perform machine learning of the second discriminator 6. That is, the learning processing part 212 constructs the second discriminator 6 which has acquired the ability of determining the acceptability of the product by performing the stepwise machine learning in which the learning data sets 121 are utilized in ascending order of the set difficulty level.

For example, the learning processing part 212 refers to the difficulty level data 125 to classify each of the learning data sets 121 included in the learning data group 120 into a plurality of groups according to the set difficulty level. Then, the learning processing part 212 sequentially uses from a group including the set low difficulty-level learning data sets 121 among the classified plurality of groups for the machine learning.

That is, for a group 226 including the lowest difficulty-level learning data sets 121, when the image data 122 is input, the learning processing part 212 performs the machine learning of the second discriminator 6 in a manner that the output value corresponding to the correct answer data 123 associated with the input image data 122 is output. After the machine learning of the group 226 is completed, the learning processing part 212 performs the same machine learning process for a group having the second highest difficulty level after the group 226. The learning processing part 212 repeats the series of processes until machine learning of a group 228 including the highest difficulty-level learning data sets 121 is completed. Thereby, the learning processing part 212 can perform the stepwise machine learning in which the learning data sets 121 are utilized in ascending order of the set difficulty level to construct the second discriminator 6 which has acquired the ability of determining the acceptability of the product.

Moreover, as described in FIG. 6, the second discriminator 6 is configured by a neural network similarly to the first discriminator 5. The second discriminator 6 may be configured similarly to the first discriminator 5. That is, an input layer 61, an intermediate layer (hidden layer) 62, and an output layer 63 may be configured similarly to each of the layers 51 to 53 of the first discriminator 5. However, a structure of the neural network of the second discriminator 6 may not match the first discriminator 5. For example, the number of layers of the neural network configuring the second discriminator 6, the number of neurons in each layer, and a coupling relationship between the neurons may be different from those of the neural network configuring the first discriminator 5. After the process of the machine learning is completed, the learning processing part 212 stores, in the storage part 22, information indicating the configuration of the trained second discriminator 6, the coupling weight between the neurons, and the threshold value of each neuron as the second learning result data 229.

Inspection Device

Figure 7:
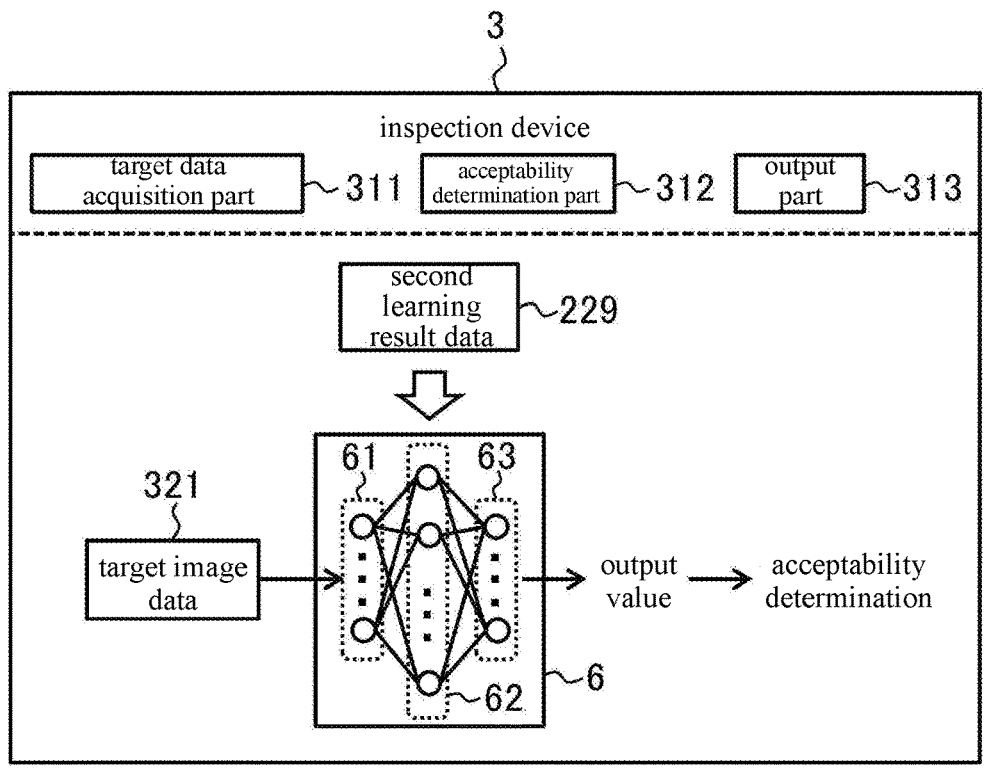
FIG. 7 schematically illustrates an example of a software configuration of the inspection device according to the embodiment.

Next, an example of a software configuration of the inspection device 3 according to the embodiment is described with reference to FIG. 7. FIG. 7 schematically illustrates the example of the software configuration of the inspection device 3 according to the embodiment.

The control part 31 of the inspection device 3 expands the inspection program 83 stored in the storage part 32 into the RAM. Then, the control part 31 interprets and executes the inspection program 83 expanded into the RAM by the CPU to control each constituent element. Accordingly, as described in FIG. 7, the inspection device 3 according to the embodiment is configured as a computer which includes a target data acquisition part 311, an acceptability determination part 312, and an output part 313 as software modules. That is, in the embodiment, each software module is realized by the control part 31 (CPU).

The target data acquisition part 311 acquires the target image data 321 of the product R which is the inspection target. In the embodiment, the target data acquisition part 311 acquires the target image data 321 by photographing the product R using the camera 41. The acceptability determination part 312 includes the trained second discriminator 6. The acceptability determination part 312 refers to the second learning result data 229 to set the trained second discriminator 6. Then, the acceptability determination part 312 inputs the acquired target image data 321 to the second discriminator 6 and performs the calculation process of the second discriminator 6, and thereby acquiring the output value from the second discriminator 6. The output value of the second discriminator 6 corresponds to the result of determining the acceptability of the product R appearing in the input target image data 321. Therefore, the acceptability determination part 312 determines the acceptability of the product R in the target image data 321 based on the output value acquired from the second discriminator 6. The output part 313 outputs the result of determining the acceptability of the product R, that is, the result of the visual inspection.

Others

Each software module of the learning data generation device 1, the learning device 2, and the inspection device 3 is described in detail in an operation example described later. Moreover, in the embodiment, an example is described in which each software module of the learning data generation device 1, the learning device 2, and the inspection device 3 is realized by a general-purpose CPU. However, some or all of the above software modules may be realized by one or more dedicated processors. In addition, regarding the respective software configurations of the learning data generation device 1, the learning device 2, and the inspection device 3, omission, replacement, and addition of the software modules may be appropriately made according to the embodiment.

§ 3 Operation Example

Creation Procedure of First Discriminator

Figure 8:
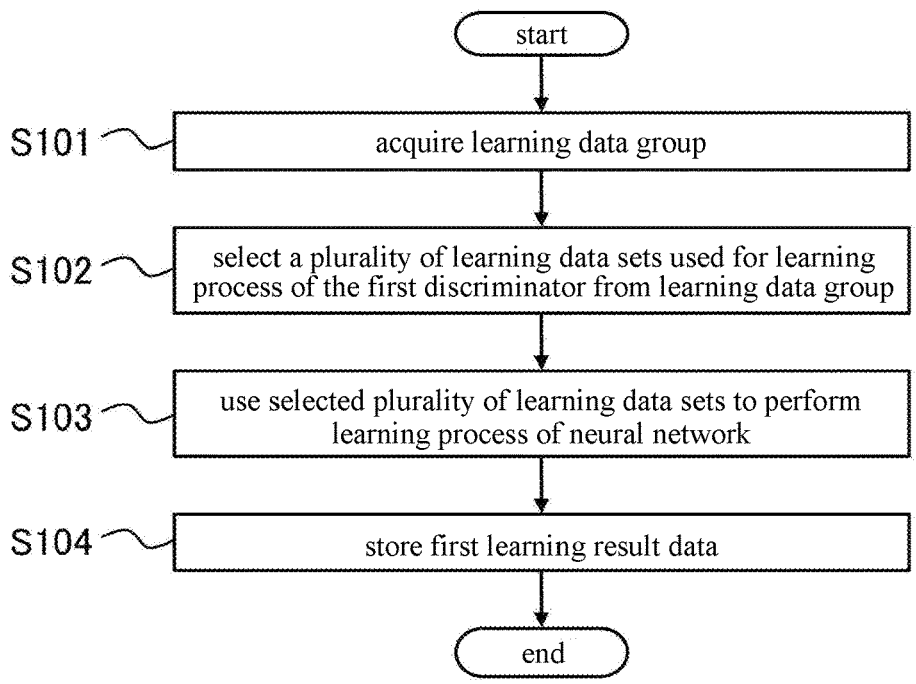
FIG. 8 illustrates an example of a processing procedure of constructing a first discriminator by the learning device according to the embodiment.

Next, an operation example of the learning device 2 when constructing the first discriminator 5 is described with reference to FIG. 8. FIG. 8 is a flowchart illustrating an example of the processing procedure constructing the first discriminator 5 by the learning device 2 according to the embodiment. However, the processing procedure described below is merely an example, and each processing may be changed as much as possible. In addition, regarding the processing procedure described below, steps can be omitted, replaced, and added appropriately according to the embodiment.

Step S101

In step S101, the control part 21 operates as the data acquisition part 211 and acquires the learning data group 120.

A method for acquiring the learning data group 120 may not be particularly limited and may be appropriately determined according to the embodiment. For example, a camera is prepared, and a product having a defect (defective product) and a product having no defect (non-defective product) which are products of the same type as the product R to be inspected are respectively photographed by the prepared camera under various conditions, and thereby, the image data 122 of the product indicating the acceptability can be acquired. Then, the learning data sets 121 can be created by combining the correct answer data 123 indicating the acceptability (correct answer) appear in the product in the image data 122 with the obtained image data 122. The specific content of the correct answer data 123 may be appropriately determined according to the embodiment of the acceptability determination described below. The creation of the learning data sets 121 is repeated, and thereby, the learning data group 120 configured by the plurality of learning data sets 121 can be created.

Moreover, the creation of the learning data group 120 may be performed by the learning device 2. In this case, the control part 21 may create the learning data group 120 according to the operation of the input device 24 by the operator. In addition, the control part 21 may automatically create the learning data group 120 by the process of the learning program 82. By performing the creation process, in the step S101, the control part 21 can acquire the learning data group 120.

Alternatively, the learning data group 120 may be created, for example, by another information processing device other than the learning device 2 such as the learning data generation device 1 or the like. In another information processing device, the learning data group 120 may be manually created by the operator or may be automatically created by processing of a program. In this case, in the step S101, the control part 21 may acquire the learning data group 120 created by another information processing device via the network, the storage medium 92, or the like.

The number of pieces of the learning data sets 121 configuring the learning data group 120 may not be particularly limited, and may be appropriately determined, for example, to an extent that the machine learning of the second discriminator 6 described below can be performed. Thereby, when the learning data group 120 is acquired, the control part 21 advances the process to the next step S102.

Step S102

In step S102, the control part 21 operates as the learning processing part 212 and selects the plurality of learning data sets 121 used for the machine learning of the first discriminator 5 from the learning data group 120. Thereby, the control part 21 creates the partial data group 221 configured by the selected plurality of learning data sets 121.

A method for selecting the learning data sets 121 to be used may not be particularly limited and may be appropriately determined according to the embodiment. For example, the control part 21 may randomly select the plurality of learning data sets 121 to be used for the machine learning of the first discriminator 5 from the learning data group 120. In addition, for example, the control part 21 may select the plurality of learning data sets 121 from the learning data group 120 according to a predetermined standard. In addition, for example, the control part 21 may select the plurality of learning data sets 121 from the learning data group 120 according to the operation of the input device 24 by the operator. When the creation of the partial data group 221 is completed, the control part 21 advances the process to the next step S103.

Step S103

In step S103, the control part 21 operates as the learning processing part 212 and constructs the first discriminator 5 which has acquired the ability of determining the acceptability of the product by the machine learning using the partial data group 221 created in step S102. In the embodiment, the control part 21 uses each of the learning data sets 121 configuring the partial data group 221 to execute the machine learning of the neural network in a manner that the output value corresponding to the correct answer data 123 is output from the output layer 53 when the image data 122 is input to the input layer 51.

Specifically, first, the control part 21 prepares a neural network (a first discriminator 5 before learning) to be subjected to learning process. Each parameter such as a configuration of the prepared neural network, an initial value of the coupling weight between the neurons, an initial value of the threshold value of each neuron, and the like may be given by a template or may be given by input of the operator.

Next, the control part 21 uses, as input data, the image data 122 included in each of the learning data sets 121 configuring the partial data group 221 created in step S102, uses the correct answer data 123 as teacher data, and performs the learning process of the neural network. A stochastic gradient descent method or the like may be used for the learning process of the neural network.

For example, the control part 21 inputs the image data 122 to the input layer 51, and performs ignition determination of each neuron included in each of the layers 51 to 53 sequentially from an input side. Thereby, the control part 21 obtains the output value from the output layer 53. Next, the control part 21 calculates an error between the output value obtained from the output layer 53 and a value corresponding to the correct answer indicated by the correct answer data 123. Then, the control part 21 uses the error of the calculated output value by an error back propagation method to calculate respective errors of the coupling weight between each neuron and the threshold value of each neuron. Then, the control part 21 updates respective values of the coupling weight between each neuron and the threshold value of each neuron based on each calculated error.

The control part 21 repeats the series of processes for each of the learning data sets 121 configuring the partial data group 221 until the output value output from the neural network matches the value corresponding to the correct answer indicated by the correct answer data 123. Thereby, when the image data 122 is input, the control part 21 can construct the trained first discriminator 5 which outputs the output value corresponding to the correct answer indicated by the correct answer data 123. When the learning process of the first discriminator 5 is completed, the control part 21 advances the process to the next step S104.

Step S104

In step S104, the control part 21 operates as the learning processing part 212 and stores, in the storage part 22, information indicating the configuration of the first discriminator 5 constructed by the machine learning, the coupling weight between the neurons, and the threshold value of each neuron as the first learning result data 224. Thereby, the control part 21 ends the process according to the operation example.

The control part 21 can construct a plurality of the first discriminators 5 by repeating a series of processes of the above steps S101 to S104. When the series of processes are repeated, the control part 21 changes the learning data sets 121 selected in step S102 and/or changes the value of the parameter of the neural network prepared in step S103. Thereby, the control part 21 respectively constructs the plurality of first discriminators 5 that have been machine-learned under different learning conditions for determining the acceptability of the product.

However, the plurality of first discriminators 5 may not be limited to this example. At least one pair of the plurality of first discriminators 5 may be constructed by machine learning under the same learning condition. The control part 21 can construct two or more first discriminators 5 that have been machine-learned under the same learning condition by repeating the series of processes of the above steps S101 to S104 without changing the learning condition.

Moreover, after the trained first discriminator 5 is constructed, the control part 21 may transfer the created first learning result data 224 to the learning data generation device 1. In addition, for example, the control part 21 may store the created first learning result data 224 in a data server such as NAS (Network Attached Storage) or the like. In this case, the learning data generation device 1 may acquire the first learning result data 224 from the data server. In addition, each piece of the first learning result data 224 may be incorporated in the learning data generation device 1 in advance.

Creation Procedure of Learning Data Sets with Difficulty Level

Figure 9:
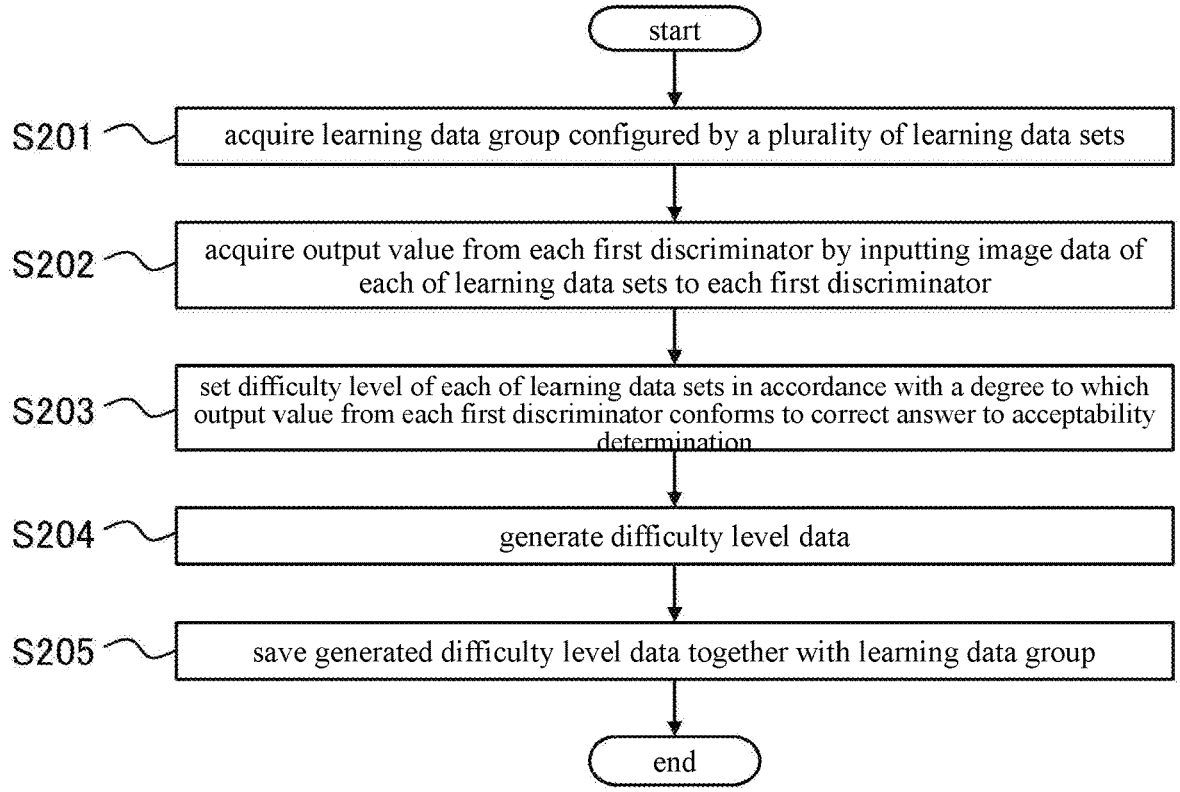
FIG. 9 illustrates an example of a processing procedure of the learning data generation device according to the embodiment.

Next, an operation example of the learning data generation device 1 when creating the learning data sets 121 with difficulty level is described with reference to FIG. 9. FIG. 9 is a flowchart illustrating an example of a processing procedure of creating the learning data sets 121 with difficulty level by the learning data generation device 1 according to the embodiment. The processing procedure described below is an example of the learning data generation method. However, the processing procedure described below is merely an example, and each processing may be changed as much as possible. In addition, regarding the processing procedure described below, steps can be omitted, replaced, and added appropriately according to the embodiment.

Step S201

In step S201, the control part 11 operates as the learning data acquisition part 111 and acquires the learning data group 120 configured by the plurality of learning data sets 121 respectively including the combination of the image data 122 and the correct answer data 123.

The learning data group 120 may be created as described above by the learning data generation device 1, and may also be created by, for example, another information processing device other than the learning data generation device 1, such as the learning device 2 or the like. That is, the control part 11 may acquire the learning data group 120 by performing the above creation process. Alternatively, the control part 11 may acquire the learning data group 120 created by another information processing device via the network, the storage medium 91, or the like. When the learning data group 120 is acquired, the control part 11 advances the process to the next step S202.

Steps S202 and S203

In step S202, the control part 11 operates as the difficulty level setting part 112, inputs the image data 122 of each of the learning data sets 121 to each first discriminator 5, and performs the calculation process of each first discriminator 5. Thereby, the control part 11 acquires the output value corresponding to the result of determining the acceptability of the product in the input image data 122 from each first discriminator 5.

Specifically, the control part 11 refers to each piece of the first learning result data 224 to set each first discriminator 5 each first discriminator 5 that has acquired the ability of determining the acceptability of the product by the machine learning. In the embodiment, each first discriminator 5 is constructed by the machine learning under different learning conditions. Then, the control part 11 inputs the image data 122 of each of the learning data sets 121 to the input layer 51 of each first discriminator 5 and performs the ignition determination of each neuron included in each of the layers 51 to 53 sequentially from the input side. Thereby, the control part 11 acquires the output value corresponding to the result of determining the acceptability of the product in the input image data 122 from the output layer 53 of each first discriminator 5.

Moreover, a format of the output value of each first discriminator 5 may not be particularly limited as long as the acceptability of the product can be determined, and may be appropriately selected according to the embodiment. For example, the output value of each first discriminator 5 may indicate whether or not there is a defect in the product. In addition, for example, the output value of each first discriminator 5 may indicate a probability that a defect exists or does not exist in the product. In addition, for example, the output value of each first discriminator 5 may indicate a type of the defect existing in the product.

Then, in step S203, the control part 11 sets the difficulty level of the determination of the acceptability for each of the learning data sets 121 in accordance with the degree to which the output value acquired from each first discriminator 5 conforms to the correct answer indicated by the correct answer data 123. Specifically, the control part 11 determines the difficulty level of each of the learning data sets 121 based on the degree to which the output value acquired from each first discriminator 5 conforms to the correct answer, and sets the determined difficulty level for each of the learning data sets 121. The difficulty level may be appropriately determined in a manner that the difficulty level is set lower for the learning data sets 121 having easier determination of acceptability and the difficulty level is set higher for the learning data sets 121 having more difficult determination of the acceptability. The difficulty level can be determined, for example, by the following three methods.

(1) First Method

In the first method, the control part 11 uses a rate of the result of determining the acceptability of the product based on the output value acquired from the plurality of first discriminators 5 matching the correct answer indicated by the correct answer data 123 (hereinafter also referred to as "accuracy rate") to determine the difficulty level of each of the learning data sets 121.

That is, the control part 11 sets a lower difficulty level for the learning data sets 121 having a higher rate at which the result of determining the acceptability of the product based on the output value acquired from the plurality of first discriminators 5 matches the correct answer indicated by the correct answer data 123. On the other hand, the control part 11 sets a higher difficulty level for the learning data sets 121 having a lower rate at which the result of determining the acceptability of the product based on the output value acquired from the plurality of first discriminators 5 matches the correct answer indicated by the correct answer data 123.

For example, a scene is supposed in which 10 first discriminators 5 are used to respectively determine acceptability of a first learning data set 121 and a second learning data set 121. In this case, nine first discriminators 5 may correctly determine the acceptability of the first learning data set 121, whereas only three first discriminators 5 correctly determine the acceptability of the second learning data set 121. At this time, the control part 11 sets the difficulty level of the first learning data set 121 low, and sets the difficulty level of the second learning data set 121 high.

Moreover, the control part 11 specifies whether the result of determining the acceptability of the product based on the output value of each first discriminator 5 matches the correct answer indicated by the correct answer data 123, and thereby deriving the accuracy rate of the determination using each first discriminator 5. Whether the result of determining the acceptability of the product based on the output value of each first discriminator 5 matches the correct answer indicated by the correct answer data 123 may be appropriately specified according to the format of the output value of each first discriminator 5.

For example, when the output value of each first discriminator 5 indicates whether or not there is a defect in the product or the type of the defect existing in the product, the output value of each first discriminator 5 can be directly used as the result of determining the acceptability. That is, the control part 11 can specify whether the result of determining the acceptability of the product based on the output value of each first discriminator 5 matches the correct answer depending on whether the output value of each first discriminator 5 matches the value of the correct answer indicated by the correct answer data 123.

In addition, for example, when the output value of each first discriminator 5 indicates the probability that a defect exists or does not exist in the product, the control part 11 can determine the acceptability of the product by comparing the output value of each first discriminator 5 with the threshold value. As a result, the control part 11 can specify whether the result of determining the acceptability of the product based on the output value of each first discriminator 5 conforms to the correct answer indicated by the correct answer data 123.

(2) Second Method

As described above, the output value of each first discriminator 5 corresponds to the result of determining the acceptability of the product in the input image data 122. Therefore, a sum and a product of the output values of each first discriminator 5 also correspond to the result of determining the acceptability of the product in the input image data 122. For example, when the output value of each first discriminator 5 indicates the probability that a defect exists or does not exist in the product, the sum or the product of the output values respectively acquired from the plurality of first discriminator 5 directly indicates a degree of presence or absence of a defect in the product.

Therefore, in the second method, the control part 11 uses the sum or the product of the output values respectively acquired from the plurality of first discriminator 5 to determine the difficulty level of each of the learning data sets 121. That is, the control part 11 sets the difficulty level of the determination of the acceptability for each of the learning data sets 121 in accordance with the degree to which the sum or the product of the output values respectively acquired from the plurality of first discriminator 5 conforms to the correct answer indicated by the correct answer data 123.

Specifically, the control part 11 sets the difficulty level of the learning data sets 121 lower as the more the sum or the product of the output values respectively acquired from the plurality of first discriminator 5 conforms to the correct answer indicated by the correct answer data 123. On the other hand, the control part 11 sets the difficulty level of the learning data sets 121 higher as the sum or the product of the output values respectively acquired from the plurality of first discriminator 5 does not conform to the correct answer indicated by the correct answer data 123.

(3) Third Method

In the third method, the control part 11 uses the number of first discriminators 5 in which the result of determining the acceptability of the product based on the output value matches the correct answer indicated by the correct answer data 123 at a predetermined confidence level or higher to determine the difficulty level of each of the learning data sets 121.

That is, the control part 11 sets the difficulty level lower for the learning data sets 121 having a greater number of the first discriminators 5 in which the result of determining the acceptability of the product based on the output value matches the correct answer indicated by the correct answer data 123 at the predetermined confidence level or higher. On the other hand, the control part 11 sets the difficulty level higher for the learning data sets 121 having a smaller number of the first discriminators 5 in which the result of determining the acceptability of the product based on the output value matches the correct answer indicated by the correct answer data 123 at the predetermined confidence level or higher.

Moreover, the confidence level can be derived from a distance between the output value from each first discriminator 5 and a decision boundary. The distance between the output value from the first discriminator 5 and the decision boundary can be calculated by Equation 1 described below. The control part 11 may determine that the result of determining by the first discriminator 5 which is a target matches the correct answer indicated by the correct answer data 123 at a predetermined confidence level or higher, for example, when the distance between the output value obtained from the first discriminator 5 which is a target and the decision boundary is a predetermined threshold value or more. That is, the control part 11 may set the difficulty level of each of the learning data sets 121 according to the number of the first discriminators 5 in which the distance between the output value and the decision boundary is the predetermined threshold value or more.

In step S203, the control part 11 can determine the difficulty level of each of the learning data sets 121 by employing at least one of the above first to third methods. Moreover, an expression format of the difficulty level may not be particularly limited as long as the level can be expressed and may be appropriately determined according to the embodiment. For example, the difficulty level may be expressed in a plurality of stages (grades). In this case, the control part 11 determines a grade belongs to each of the learning data sets 121 by each method above and sets the determined grade as the difficulty level of each of the learning data sets 121. In addition, for example, the difficulty level may be expressed by a numerical value (score). In this case, the control part 11 derives the score of the difficulty level of each of the learning data sets 121 by each method above and sets the derived score as the difficulty level of each of the learning data sets 121. When the setting of the difficulty level of each of the learning data sets 121 is completed, the control part 11 advances the process to the next step S204.

Steps S204 and S205

In step S204, the control part 11 operates as the saving processing part 113 and generates the difficulty level data 125 indicating a corresponding relationship between each of the learning data sets 121 and the set difficulty level. A data format of the difficulty level data 125 may not be particularly limited and may be appropriately determined according to the embodiment. As data format of the difficulty level data 125, for example, a known data format such as a table format or the like can be employed.

Then, in step S205, the control part 11 operates as the saving processing part 113 and saves the generated difficulty level data 125 to a predetermined storage region together with the learning data group 120. The predetermined storage region may be the storage part 12, or may be, for example, the storage part 22 of the learning device 2, an external storage region such as NAS, or the like. When the saving of the difficulty level data 125 is completed, the control part 11 ends the process according to the operation example.

Moreover, after the difficulty level data 125 is generated, the control part 11 may transfer the generated difficulty level data 125 to the learning device 2. In addition, when the difficulty level data 125 is saved in the storage part 12, the NAS, or the like, the learning device 2 may acquire the difficulty level data 125 from the storage part 12, the NAS, or the like.

Creation Procedure of Second Discriminator

Figure 10:
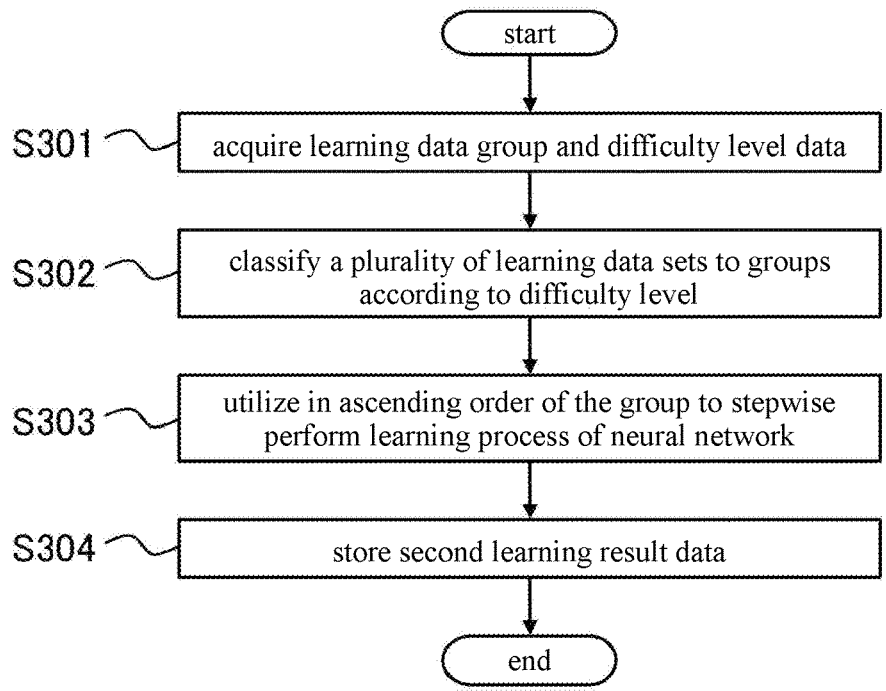
FIG. 10 illustrates an example of a processing procedure of constructing a second discriminator by the learning device according to the embodiment.

Next, an operation example of the learning device 2 when constructing the second discriminator 6 is described with reference to FIG. 10. FIG. 10 is a flowchart illustrating an example of the processing procedure constructing the second discriminator 6 by the learning device 2 according to the embodiment. However, the processing procedure described below is merely an example, and each processing may be changed as much as possible. In addition, regarding the processing procedure described below, steps can be omitted, replaced, and added appropriately according to the embodiment.

Step S301

In step S301, the control part 21 operates as the data acquisition part 211 and acquires the learning data group 120. The step S301 may be processed similarly to the above step S101. In addition, the control part 21 acquires the difficulty level data 125. When the learning data group 120 and the difficulty level data 125 are acquired, the control part 21 advances the process to the next step S302.

Steps S302 and S303

In steps S302 and S303, the control part 21 operates as the learning processing part 212 and constructs, by performing the stepwise machine learning in which the learning data sets 121 are utilized in ascending order of the set difficulty level, the second discriminator 6 that has acquired the ability of determining the acceptability of the product.

Specifically, in step S302, the control part 21 refers to the difficulty level data 125 to classify each of the learning data sets 121 included in the learning data group 120 into a plurality of groups according to the set difficulty level. The number of the set groups may not be particularly limited and may be appropriately determined according to, for example, the number of the learning data sets 121, the type of the difficulty level (for example, a type of the grade, a range of the score) or the like.

Moreover, the control part 21 may classify the learning data sets 121 having different difficulty levels into the same group as long as each group is set in stages according to the difficulty level. For example, a scene is supposed in which the range of the difficulty level is "1" to "5", and each of the learning data sets 121 is classified into two groups. In this case, the control part 21 may classify learning data sets 121 having difficulty levels of "1" and "2" and a part of a learning data set 121 having a difficulty level of "3" to a first group. Then, the control part 21 may classify learning data sets 121 having difficulty levels of "4" and "5" and the rest of the learning data set 121 having a difficulty level of "3" to a second group.

Then, in step S303, the control part 21 sequentially uses from groups including the set low difficulty-level learning data sets 121 among classified plurality of groups to perform the machine learning of the second discriminator 6. The machine learning using each group may be performed similarly to the above step S103.

That is, the control part 21 repeats the above series of processes of updating respective values of the coupling weight between each neuron and the threshold value of each neuron until the output value output from the neural network matches the value corresponding to the correct answer data 123 for each of the learning data sets 121 included in each group. Thereby, when the image data 122 is input, the control part 21 can construct the trained second discriminator 6 which outputs the output value corresponding to the correct answer indicated by the correct answer data 123.

The control part 21 applies the learning process of the neural network sequentially from the group including the low difficulty-level learning data sets 121. That is, the control part 21 first applies the group 226 including the lowest difficulty-level learning data sets 121 to the learning process. Thereby, when the image data 122 is input to each of the learning data sets 121 included in the group 226, the control part 21 constructs the trained second discriminator 6 that outputs the output value corresponding to the correct answer data 123 associated with the input image data 122. Next, the control part 21 selects a group having the second highest difficulty level after the group 226 and performs the same learning process for the selected group. The control part 21 repeats the series of machine learning processes until the learning process of the group 228 including the highest difficulty-level learning data sets 121 is completed. Thereby, the control part 21 can perform the stepwise machine learning in which the learning data sets 121 are utilized in ascending order of the set difficulty level to construct the second discriminator 6 which has acquired the ability of determining the acceptability of the product.

Step S304

In step S304, the control part 21 operates as the learning processing part 212 and stores, in the storage part 22, information indicating the configuration of the second discriminator 6 constructed by the machine learning, the coupling weight between the neurons, and the threshold value of each neuron as the second learning result data 229. Thereby, the control part 21 ends the process according to the operation example.

Moreover, after the second discriminator 6 is constructed, the control part 21 may transfer the created second learning result data 229 to the inspection device 3. In addition, the control part 21 may store the created second learning result data 229 in a data server such as NAS or the like. In this case, the inspection device 3 may acquire the second learning result data 229 from the data server. In addition, the second learning result data 229 created by the learning device 2 may be incorporated in the inspection device 3 in advance.

Inspection Procedure

Figure 11:
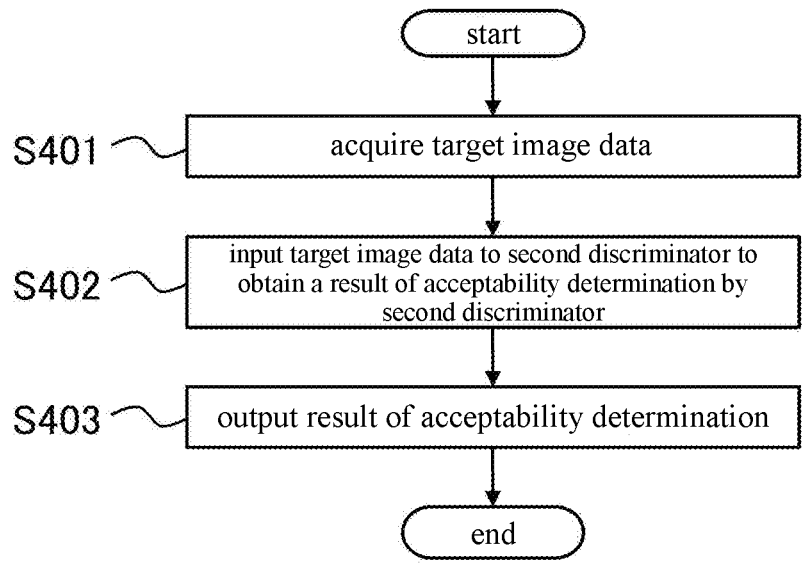
FIG. 11 illustrates an example of a processing procedure of the inspection device according to the embodiment.

Next, an operation example of the inspection device 3 is described with reference to FIG. 11. FIG. 11 is a flowchart illustrating an example of the processing procedure of the inspection device 3. However, the processing procedure described below is merely an example, and each processing may be changed as much as possible. In addition, regarding the processing procedure described below, steps can be omitted, replaced, and added appropriately according to the embodiment.

Step S401

In step S401, the control part 31 operates as the target data acquisition part 311 and acquires the target image data 321 of the product R which is the inspection target. In the embodiment, the inspection device 3 is connected to the camera 41 via the external interface 34. Therefore, the control part 31 acquires the target image data 321 from the camera 41. The target image data 321 may be moving image data or still image data. When the target image data 321 is acquired, the control part 31 advances the process to the next step S402.

However, a route for acquiring the target image data 321 may not be limited to this example and may be appropriately selected according to the embodiment. For example, another information processing device different from the inspection device 3 may be connected to the camera 41. In this case, the inspection device 3 may acquire the target image data 321 by accepting transmission of the target image data 321 from another information processing device.

Step S402

In step S402, the control part 31 operates as the acceptability determination part 312 and acquires the output value from the second discriminator 6 by inputting the acquired target image data 321 to the second discriminator 6 to perform the calculation process of the second discriminator 6. Then, the control part 31 determines the acceptability of the product R in the target image data 321 based on the output value acquired from the second discriminator 6.

Specifically, the control part 31 refers to the second learning result data 229 to set the trained second discriminator 6. Then, the control part 31 inputs the target image data 321 to the input layer 61 of the second discriminator 6 and performs ignition determination of each neuron included in each of the layers 61 to 63 sequentially from an input side. Thereby, the control part 31 acquires, from the output layer 63 of the second discriminator 6, the output value corresponding to the result of determining the acceptability of the product R in the input target image data 321.

A format of the output value of the second discriminator 6 may be appropriately selected according to the embodiment similar to the first discriminator 5 above. For example, the output value of the second discriminator 6 may indicate whether or not there is a defect in the product, or a probability that a defect exists or does not exist in the product. In this case, the control part 31 can determine whether or not there is a defect in the product R based on the output value acquired from the second discriminator 6.

In addition, for example, the output value of the second discriminator 6 may indicate a type of the defect existing in the product. In this case, the inspection device 3 may store, in the storage part 32, reference information (not shown) such as a table format in which the output value of the second discriminator 6 and the type of the defect are associated with each other. In the step S402, the control part 31 can specify the type of the defect corresponding to the output value acquired from the second discriminator 6 with reference to the reference information.

That is, according to the format of the output value of the second discriminator 6, determining the acceptability of the product R may be determining whether or not there is a defect in the product R, deriving the probability that a defect exists or does not exist in the product, specifying the type of the defect existing in the product R, or the like. When the determination of the acceptability of the product R is completed, the control part 31 advances the process to the next step S403.

Step S403

In step S403, the control part 31 operates as the output part 313 and outputs the result of determining the acceptability of the product R by step S402.

An output format of the result of determining the acceptability of the product R may not be particularly limited and may be appropriately selected according to the embodiment. For example, the control part 31 may directly the result of determining the acceptability of the product R to the output device 36. In addition, in step S402, when it is determined that there is a defect in the product R, the control part 31 may perform a warning for notifying that the defect is found as the output process in the step S403. In addition, if the inspection device 3 is connected to the production line where the product is transported, when it is determined that there is a defect in the product R, the control part 31 may perform, as the output process of the step S403, a process of transmitting, to the production line, an instruction for transporting the product R having a defect and a product having no defect in different routes.

When the output process of the result of determining the acceptability of the product R is completed, the control part 31 ends the process according to the operation example.

Moreover, the control part 31 may perform the series of processes of the steps S401 to S403 every time the product R transported on the production line enters a photograph range of the camera 41. Thereby, the inspection device 3 can perform the visual inspection of the product R transported on the production line.

Adding Procedure of Learning Data Sets

Figure 12:
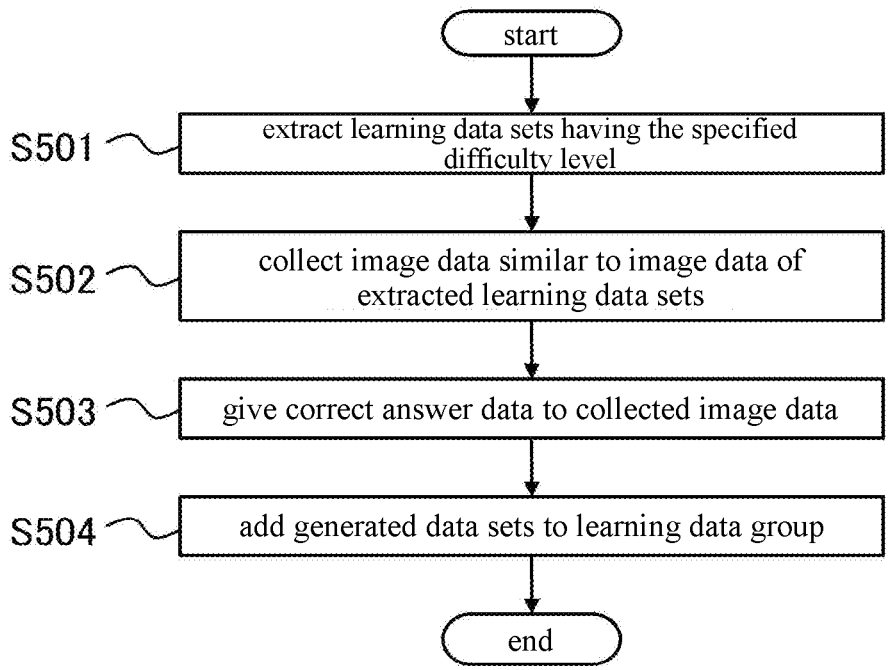
FIG. 12 illustrates an example of a processing procedure of collecting additional learning data sets by the learning data generation device according to the embodiment.

Next, an operation example of the learning data generation device 1 when additional learning data sets 181 are collected is described with reference to FIG. 12. FIG. 12 is a flowchart illustrating an example of a processing procedure of collecting the additional learning data sets 181 by the learning data generation device 1. However, the processing procedure described below is merely an example, and each processing may be changed as much as possible. In addition, regarding the processing procedure described below, steps can be omitted, replaced, and added appropriately according to the embodiment.

Step S501

In step S501, the control part 11 operates as the learning data acquisition part 111 and refers to the difficulty level data 125 to extract the learning data sets 180 having the specified difficulty level from the learning data group 120 based on the difficulty level set for each of the learning data sets 121.

The extracted difficulty level may be appropriately determined according to the embodiment. For example, the control part 11 may extract learning data sets 121 which has the highest set difficulty level as the learning data sets 180. In addition, for example, the control part 11 may accept designation of the extracted difficulty level via the operation of the input device 14 by the operator. In this case, the control part 11 may extract the learning data sets 121 of which the difficulty level is designated by the operator as the learning data sets 180. When the extraction of the learning data sets 180 is completed, the control part 11 advances the process to the next step S502.

Step S502

In step S502, the control part 11 operates as the learning data acquisition part 111 and collects the additional image data 182 similar to the image data 122 included in the learning data sets 180 having the specified difficulty level which are extracted in step S501.

A method for acquiring the additional image data 182 may be appropriately selected according to the embodiment. When a camera (not shown) is connected to the learning data generation device 1, the control part 11 may acquire the additional image data 182 by photographing the product by the camera. In addition, when image data in the product separate from the learning data group 120 is saved in the such as the storage part 12, the NAS, or the like, the control part 11 may acquire the image data saved in the storage region as the additional image data 182.

In addition, a method for determining whether the image data 122 included in the extracted learning data sets 180 having specified difficulty level and the additional image data 182 are similar may be appropriately determined according to the embodiment. For example, the control part 11 may calculate, based on a degree of coincidence of pixel values, a degree of coincidence between image data that is a candidate of the additional image data 182 and the image data 122 in the extracted learning data sets 180. Then, the control part 11 may determine that the candidate image data is similar to the image data 122 in the extracted learning data sets 180 when the calculated degree of coincidence exceeds a predetermined threshold value, and may acquire the candidate image data as the additional image data 182. On the other hand, when the calculated degree of coincidence does not exceed the predetermined threshold value, the control part 11 may determine that the candidate image data is not similar to the image data 122 and exclude the image data from the candidate of the additional image data 182. Moreover, the threshold value may be appropriately determined.

In addition, the number of the pieces of the collected additional image data 182 may be appropriately determined according to the embodiment. For example, the number of the pieces of the collected additional image data 182 may be defined by a set value. In addition, for example, the control part 11 may accept designation of the number of the pieces of the collected additional image data 182 via the operation of the input device 14 by the operator. When the collection of the additional image data 182 is completed, the control part 11 advances the process to the next step S503.

Step S503

In step S503, the control part 11 operates as the learning data acquisition part 111 and generates the new learning data sets 181 by giving the correct answer data 183 indicating the correct answer to the determination of the acceptability of the product in the additional image data 182 with respect to the additional image data 182 collected in step S502.

The specific content of the correct answer data 183 may be appropriately determined. For example, the control part 11 may acquire, as the correct answer data 183, the correct answer data 123 associated with the image data 122 from which the additional image data 182 is collected from the learning data group 120. In addition, for example, the control part 11 may determine the content of the correct answer data 183 according to the operation of the input device 14 by the operator.

Step S504

In step S504, the control part 11 operates as the learning data acquisition part 111 and saves the generated new learning data sets 181 to the storage region where the learning data group 120 is saved. Thereby, the control part 11 adds the generated new learning data sets 181 to the learning data group 120. When the addition of the generated new learning data sets 181 is completed, the control part 11 ends the process according to the operation example.

Due to a reason such as a shortage of the number of the learning data sets 121 configuring the learning data group 120, a shortage of the number of the learning data sets 121 having the specified difficulty level, or the like, there is a possibility that the learning device 2 cannot construct the second discriminator 6 having high performance. Therefore, the process of adding the learning data sets by the above steps S501 to S504 may be performed when the performance of the second discriminator 6 constructed by the learning device 2 is insufficient. Thereby, the shortage of the number of the learning data sets 121 can be solved, and the second discriminator 6 having high performance can be constructed by the learning device 2.

Moreover, sets of data for evaluation collected similarly to the learning data sets 121 of the learning data group 120 may be used for determination of whether the performance of the second discriminator 6 is insufficient. That is, by inputting image data included in the sets of data for evaluation to the second discriminator 6, an output value corresponding to a result of determining acceptability of a product in the image data can be obtained from the second discriminator 6. Then, whether the second discriminator 6 can correctly perform the determination of the acceptability can be determined according to whether the output value acquired from the second discriminator 6 matches a correct answer indicated by correct answer data associated with the input image data. For example, the performance of the second discriminator 6 can be evaluated based on a rate at which the second discriminator 6 may correctly perform the determination of the acceptability with respect to the sets of data for evaluation. A series of evaluation processes of the second discriminator 6 may be performed by any one of the learning data generation device 1, the learning device 2, and the inspection device 3 or may be performed by another information processing device other than these.

In addition, the learning data generation device 1 may use the updated learning data group 120 to transmit an instruction of performing the machine learning of the second discriminator 6 again to the learning device 2 after the addition of the generated new learning data sets 181 is completed. The learning device 2 may perform re-learning of the second discriminator 6 by performing the series of processes of the above steps S301 to S304 in response to receiving the instruction.

At this time, a difficulty level of the new learning data sets 181 may be appropriately set. For example, the control part 11 may set the difficulty level extracted in step S501 as the difficulty level of the new learning data sets 181. In addition, for example, the control part 11 may set the difficulty level of the new learning data sets 181 by performing the processes of the above steps S202 and S203 with respect to the new learning data sets 181.

In addition, the control part 11 displays the image data 122 included in the learning data sets 180 having the specified difficulty level extracted in step S501 on a display (the output device 15), and may promote the collection of the additional image data 182 to the operator. In response to this, the control part 11 may acquire the input image data as the additional image data 182 by accepting the input of the image data.

Characteristic

Among the learning data sets used for the machine learning, there are learning data sets discriminated easily and learning data sets discriminated difficultly. When only the learning data sets discriminated easily are used to perform the machine learning, there is a possibility that a discriminator that can handle a case in which the determination of the acceptability of the product is difficult cannot be constructed. On the other hand, when only the learning data sets discriminated difficultly are used to perform the machine learning, there is a possibility that the discriminator having high generalization ability cannot be constructed because of conforming too much to discrimination in special cases. Furthermore, when the machine learning is performed in a state where the learning data sets discriminated easily and the learning data sets discriminated difficultly are mixed, there is a possibility that the discriminator having high generalization ability cannot be constructed due to a reason of falling into a local solution that determines the acceptability of the product appears in the learning data group.

With respect to which, in the inspection system 100 according to the embodiment, by the processes of the above steps S202 and S203, the plurality of the first discriminator 5 can be used to appropriately set the difficulty level of the determination of the acceptability for each of the learning data sets 121 included in the learning data group 120. Then, in steps S302 and S303, the inspection system 100 according to the embodiment constructs the second discriminator 6 which determines the acceptability of the product by performing the stepwise machine learning in which the learning data sets 121 are utilized in ascending order of the set difficulty level. Accordingly, first, by the machine learning using the low difficulty-level learning data sets 121, the second discriminator 6 can acquire an overall tendency of the determination of the acceptability appear in the learning data group 120. Thereafter, by machine learning using the high difficulty-level learning data sets 121, the second discriminator 6 can acquire a tendency of the determination of the acceptability appear in the learning data group 120.

Thus, according to the embodiment, in the process of step S303, the second discriminator 6 having a relatively high generalization performance that can be achieved by the prepared learning data group 120 can be constructed. Therefore, in the process of the above steps S401 to S403, the inspection system 100 according to the embodiment can determine the acceptability of the product R in the target image data 321 with relatively high precision by the second discriminator 6 constructed in step S303.

§ 4 Variation Example

Although the embodiment of the present invention has been described above in detail, the above description is merely an example of the present invention in all aspects. It is evident that various improvements or modifications can be made without departing from the scope of the present invention. For example, the following changes are possible. Moreover, in the following, the same constituent elements as the above embodiment are denoted by the same reference signs, and the description of the same points as the above embodiment is omitted appropriately. The following variation examples can be combined appropriately.

4.1

In the above embodiment, each first discriminator 5 may be constructed by the learning device 2. However, a device for constructing the first discriminator 5 may not be limited to the learning device 2. At least one of the plural first discriminators 5 may be constructed by another information processing device other than the learning device 2. When each first discriminator 5 is constructed by another information processing device, the series of processes of the above steps S101 to S104 may be omitted.

In addition, in the above embodiment, the plurality of learning data sets 121 selected from the learning data group 120 is use for the machine learning of each first discriminator 5. However, learning data sets used for the machine learning of each first discriminator 5 may not be limited to this example. Learning data sets not derived from the learning data group 120 may be used for the machine learning of each first discriminator 5. The learning data sets can be appropriately acquired.

4.2

In the above embodiment, each discriminator (5, 6) is configured by a fully coupled neural network having a multilayer structure. However, a type of the neural network configuring each discriminator (5, 6) may not be limited to this example and may be appropriately selected according to the embodiment. For example, as the neural network configuring each discriminator (5, 6), a convolutional neural network, a recursive neural network, or the like may be employed. Moreover, a type of a neural network employed by at least a part of the plurality of first discriminators 5 may be different from a type of a neural network employed by the other first discriminators 5.

In addition, in the above embodiment, the neural network is used as learning model of each discriminator (5, 6). However, the learning model of each discriminator (5, 6) may not be limited to this example and may be appropriately selected according to the embodiment. As the learning model of each discriminator (5, 6), for example, a support vector machine or the like may be used. Moreover, a learning model employed by at least a part of the plurality of first discriminators 5 may be different from a learning model employed by the other first discriminator 5.

4.3

In the above embodiment, the learning data acquisition part 111 can add the new learning data sets 181 to the learning data group 120 by the series of processes of steps S501 to S504. However, the learning data acquisition part 111 may not be configured in this way. In this case, in the above embodiment, the series of processes of steps S501 to S504 may be omitted.

4.4

In the above embodiment, the first learning result data 224 and the second learning result data 229 respectively include the information indicating the configuration of the neural network. However, the configurations of the first learning result data 224 and the second learning result data 229 may not be limited to this example and may be appropriately determined according to the embodiment as long as being capable of being used for setting each trained discriminator (5, 6). For example, when the configuration of the used neural network is common to each device, the first learning result data 224 and the second learning result data 229 may not respectively include the information indicating the configuration of the neural network.

4.5

In the above embodiment, the learning data generation device 1 uses the plurality of first discriminators 5 to determine the difficulty level of each of the learning data sets 121. However, a method for determining the difficulty level of each of the learning data sets 121 may not be limited to this example. The difficulty level of each of the learning data sets 121 may be determined by one first discriminator 5.

Figure 13:
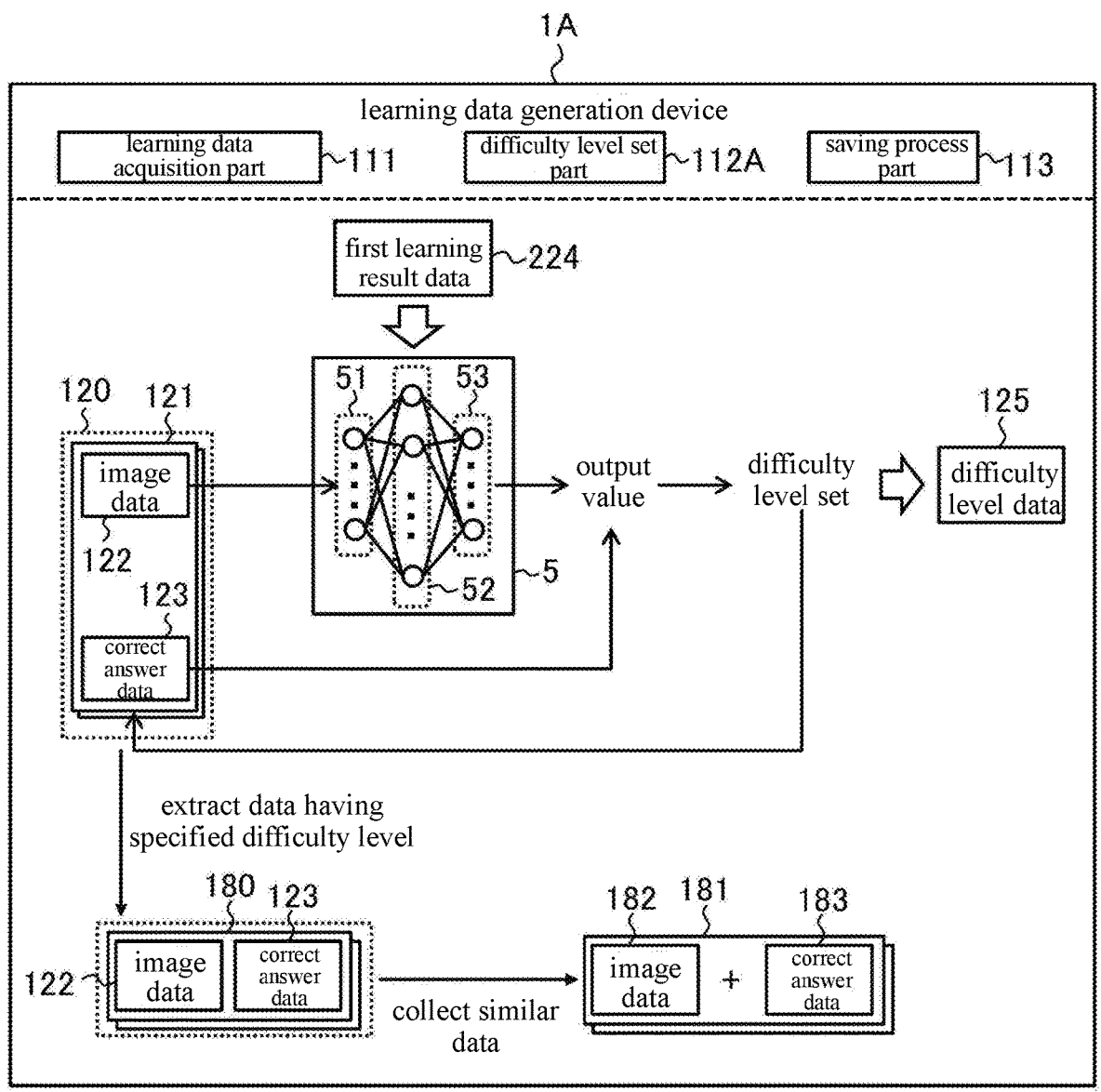
FIG. 13 schematically illustrates an example of a software configuration of a learning data generation device according to another embodiment.

FIG. 13 schematically illustrates an example of a software configuration of a learning data generation device 1A according to the variation example. The learning data generation device 1A may be configured similarly to the learning data generation device 1 according to the above embodiment, except that a method for determining the difficulty level of each of the learning data sets 121 is different. That is, a hardware configuration of the learning data generation device 1A may be the same as the hardware configuration of the learning data generation device 1. In addition, the software configuration of the learning data generation device 1A may be the same as the software configuration of the learning data generation device 1, except that the difficulty level setting part 112 is replaced with a difficulty level setting part 112A including one first discriminator 5. An inspection system according to the variation example may be configured the learning data generation device 1A, the learning device 2, and the inspection device 3.

A control part of the learning data generation device 1A according to the variation example can create learning data sets 121 with difficulty level by a processing procedure similar to the learning data generation device 1 according to the above embodiment except that the process contents of the steps S202 and S203 are different. In addition, the control part of the learning data generation device 1A can add the new learning data sets 181 to the learning data group 120 by performing the processes of steps S501 to S504.

In the variation example, in step S202, the control part of the learning data generation device 1A operates as the difficulty level setting part 112A and sets the first discriminator 5 that has acquired the ability of determining the acceptability of the product by machine learning with reference to the first learning result data 224. Then, the control part inputs the image data 122 of each of the learning data sets 121 to the input layer 51 of the first discriminator 5 and performs the ignition determination of each neuron included in each of the layers 51 to 53 sequentially from the input side. Thereby, the control part acquires, from, the first discriminator 5 the output value corresponding to the result of determining the acceptability of the product in the input image data 122.

In the next step S203, the control part operates as the difficulty level setting part 112A and calculates a distance between the output value calculated from the first discriminator 5 and a decision boundary of the first discriminator 5 for determining the acceptability of the product. Then, the control part sets the difficulty level of the determination of the acceptability for each of the learning data sets 121 according to the calculated distance.

The distance between the decision boundary of the discriminator and the output value of the discriminator indicates easiness of the determination of the acceptability of the product in the image data input for obtaining the output value. That is, the greater the distance between the decision boundary of the discriminator and the output value of the discriminator, the easier the determination of the acceptability of the product in the image data input for obtaining the output value. On the other hand, the smaller the distance between the decision boundary of the discriminator and the output value of the discriminator, the more difficult the determination of the acceptability of the product in the corresponding image data.

Therefore, the control part sets the difficulty level of each of the learning data sets 121 to be inversely proportional to the distance between the output value calculated from the first discriminator 5 and the decision boundary. That is, the control part sets the difficulty level lower for the learning data sets 121 having a greater distance between the output value calculated from the first discriminator 5 and the decision boundary. On the other hand, the control part sets the difficulty level higher for the learning data sets 121 having a smaller distance between the output value calculated from the first discriminator 5 and the decision boundary. Thereby, the learning data generation device 1A according to the variation example can appropriately set the difficulty level of each of the learning data sets 121 similarly to the above embodiment.

Moreover, the decision boundary of the first discriminator 5 can be expressed by, for example, the following expression 1 with respect to a coordinate space of the input data.

$$\text{sign}\{f(x)-b\} \qquad \text{[Expression 1]}$$

x indicates the input data, and b indicates a constant. Input data whose expression 1 has a value of 0 indicates the decision boundary. Therefore, the control part inputs the image data 122 to the x in the expression 1 for each of the learning data sets 121, and can calculate the distance between the output value from the first discriminator 5 and the decision boundary by calculating an absolute value of the formula of the expression 1.

4.6

In the above embodiment, an example is shown in which the present invention is applied to a scene in which visual inspection of the product is performed. However, an application range of the present invention may not be limited to this scene of the visual inspection. The present invention can be widely applied to a scene in which some characteristic, that is, a state of a subject is determined from image data.

Figure 14:
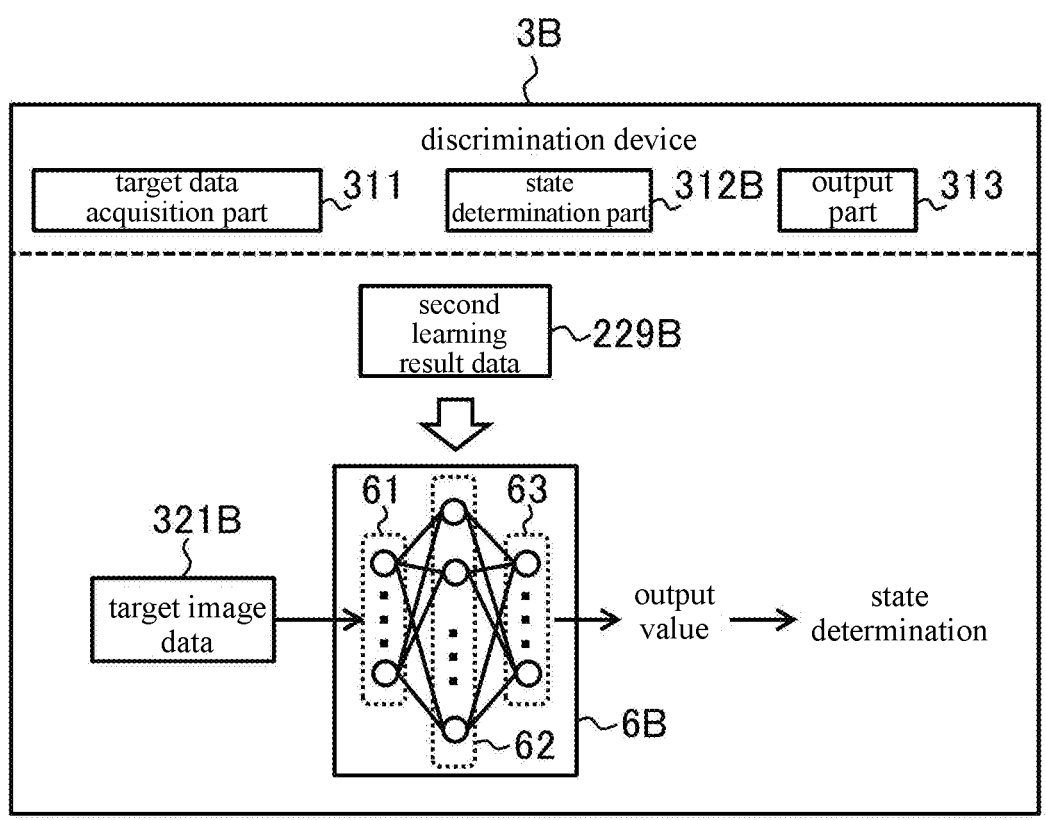
FIG. 14 schematically illustrates an example of a software configuration of a discrimination device according to another embodiment.

FIG. 14 schematically illustrates an example of a software configuration of a discrimination device 3B according to the variation example. A discrimination system according to the variation example may be configured similarly to the inspection system 100, except that the data to be processed is replaced with some image data of the subject from the image data of the product. That is, the discrimination system according to the variation example may be configured by the learning data generation device 1, the learning device 2, and the discrimination device 3B. A hardware configuration of the discrimination device 3B may be the same as the hardware configuration of the inspection device 3. In addition, a software configure of the discrimination device 3B may be the same as the software configuration of the inspection device 3 except that the acceptability determination part 312 is replaced with a state determination part 312B.

In the variation example, the subject may include any object that can be in the image data, for example, a face of an object person, a body of the object person, a work-piece to be worked, or the like. In addition, the state of the subject may include any attribute of the subject that can be determined by the discriminator. When the subject is the face, the state to be discriminated may be, for example, a type of facial expression, a position of a facial part (including organs) (including a relative position relationship between specific organs), a shape of the facial part, a colour of the facial part, a state (an opening degree, an angle, or the like) of the facial part, the individual who owns the face, or the like. The individual who owns the face may be determined to execute face authentication. When the subject is the body of the object person, the state to be discriminated may be, for example, the pose of the body, and the like. When the subject is the work-piece to be worked, the state to be discriminated may be, for example, a position and orientation of the work-piece, and the like.

In the variation example, the learning data sets 121 are replaced with learning data sets including a combination of the image data, and correct answer data indicating a correct answer to determination of the state of the subject in the image data. Thereby, the learning device 2 can construct the same processing procedures similar to the above embodiment, each discriminator that has acquired an ability of determining the state of the subject. That is, the learning device 2 can generate, by changing learning conditions and repeating the processes of the above steps S101 to S104, a plurality of first discriminators that has acquired the ability of determining the state of the subject by machine learning under different learning conditions.

In addition, in the variation example, by the process of the above step S201, the learning data generation device 1 acquires a learning data group configured by the plurality of learning data sets respectively including the combination of the image data and the correct answer data indicating the correct answer to determination of the state of the subject in the image data. Next, by the process of the above step S202, the learning data generation device 1 inputs the image data of each piece of learning data to each first discriminator that has acquired the ability of determining the state of the subject by the machine learning, and performs the calculation process of each first discriminator. Also in the variation example, similarly to the above embodiment, the plurality of first discriminators constructed by the machine learning under different learning conditions may be used. Thereby, the learning data generation device 1 acquires output values corresponding to a result of determining the state of the subject in the input image data respectively the plurality of first discriminators. Then, by the process of the above step S203, the learning data generation device 1 sets a difficulty level of the determination for each of the learning data sets in accordance with a degree to which the output value acquired from each first discriminator conforms to the correct answer indicated by the correct answer data. As a determination method of the difficulty level, any of the above first to third methods may be employed. Then, by the above steps S204 and S205, the learning data generation device 1 generates difficulty level data indicating a corresponding relationship between each of the learning data sets and the set difficulty level, and saves the generated difficulty level data in a predetermined storage region together with the learning data group.

In addition, in the variation example, by the processes of the above steps S301 to S303, the learning device 2 constructs a second discriminator 6B that determines the state of the subject by performing stepwise machine learning in which the learning data sets are utilized in ascending order of the set difficulty level. Then, by the process of the above step S304, the learning device 2 stores information indicating a configuration of the second discriminator 6B constructed by machine learning, a coupling weight between neurons, and a threshold value of each neuron as second learning result data 229B in the storage part 22.

In addition, in the variation example, by the process of the above step S401, a control part of the discrimination device 3B operates as the target data acquisition part 311 and acquires target image data 321B of the subject which is a target of which the state is to be determined. In step S402, the control part of the discrimination device 3B operates as the state determination part 312B and refers to the second learning result data 229B to set the trained second discriminator 6B. Then, the control part inputs the acquired target image data 321B to the second discriminator 6B and performs a calculation process of the second discriminator 6B. Thereby, the control part acquires the output value from the second discriminator 6B and determines the state of the subject in the target image data 321B based on the acquired output value. Then, by the process of the above step S403, the control part operates as the output part 313 and outputs the result of determining the state of the subject.

As described above, in the variation example, the second discriminator 6B can be constructed which can determine the state of the subject in the target image data with relatively high precision. Therefore, in the discrimination device 3B, the state of the subject in the target image data 321B can be determined with relatively high precision.

Moreover, in the variation example, by the process of the above step S501, the learning data generation device 1 may extract the learning data sets having a specified difficulty level from the learning data group based on the difficulty level set for each of the learning data sets. Next, by the process of the above step S502, the learning data generation device 1 may collect additional image data similar to the image data included in the extracted learning data sets having the specified difficulty level. Then, by the process of the above step S503, the learning data generation device 1 may generate new learning data sets by giving the correct answer data indicating the correct answer to the determination of the state of the subject in the additional image data with respect to the collected additional image data. Then, by the process of the above step S504, the learning data generation device 1 may add the generated new learning data sets to the learning data group.

In addition, similarly to the above <4.5>, also in the variation example, the difficulty level of each of the learning data sets may be determined using one first discriminator instead of using the plurality of first discriminators. That is, in the above step S202, the learning data generation device 1 may acquire, by inputting the image data of each of the learning data sets to the first discriminator that has acquired the ability of determining the state of the subject by the machine learning, the output value corresponding to the result of determining the state of the subject in the input image data to the first discriminators. Then, in the above step S203, the learning data generation device 1 may calculate the distance between the output value acquired from the first discriminator and the decision boundary of the first discriminator for determining the state of the subject, set the difficulty level of the determination for each of the learning data sets according to the calculated distance.

4.7

In the above embodiment and variation example, the example is shown in which the present invention is applied to the scene in which some characteristic (the state of the subject) is determined from the image data. However, an applicable range of the present invention may not be limited to the scene in which the characteristic is determined from this image data. The present invention can be widely applied to a scene in which some characteristic is discriminated from data other than the image data or a plurality of types of data.

Figure 15:
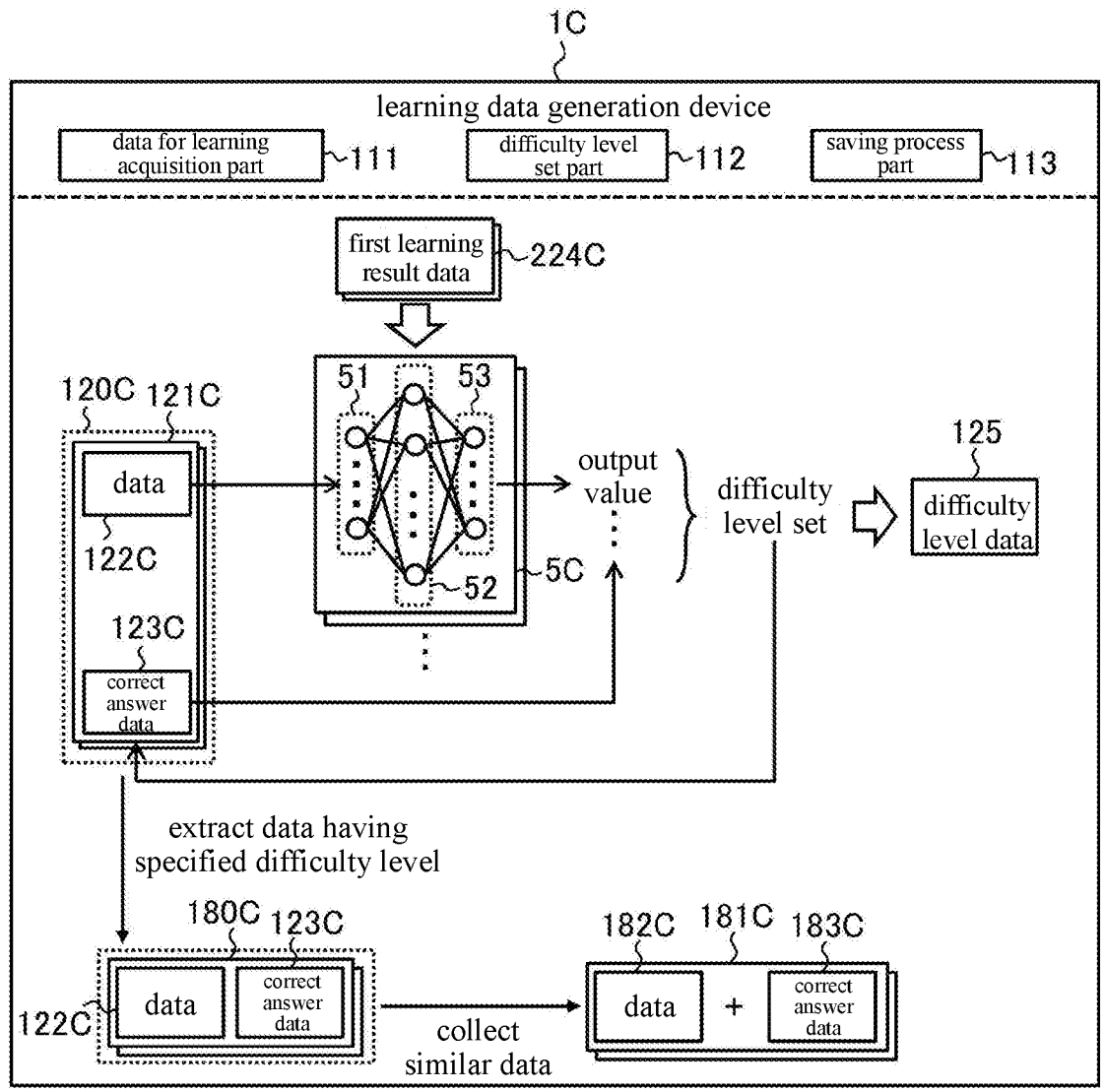
FIG. 15 schematically illustrates an example of a software configuration of a learning data generation device according to another embodiment.
Figure 16:
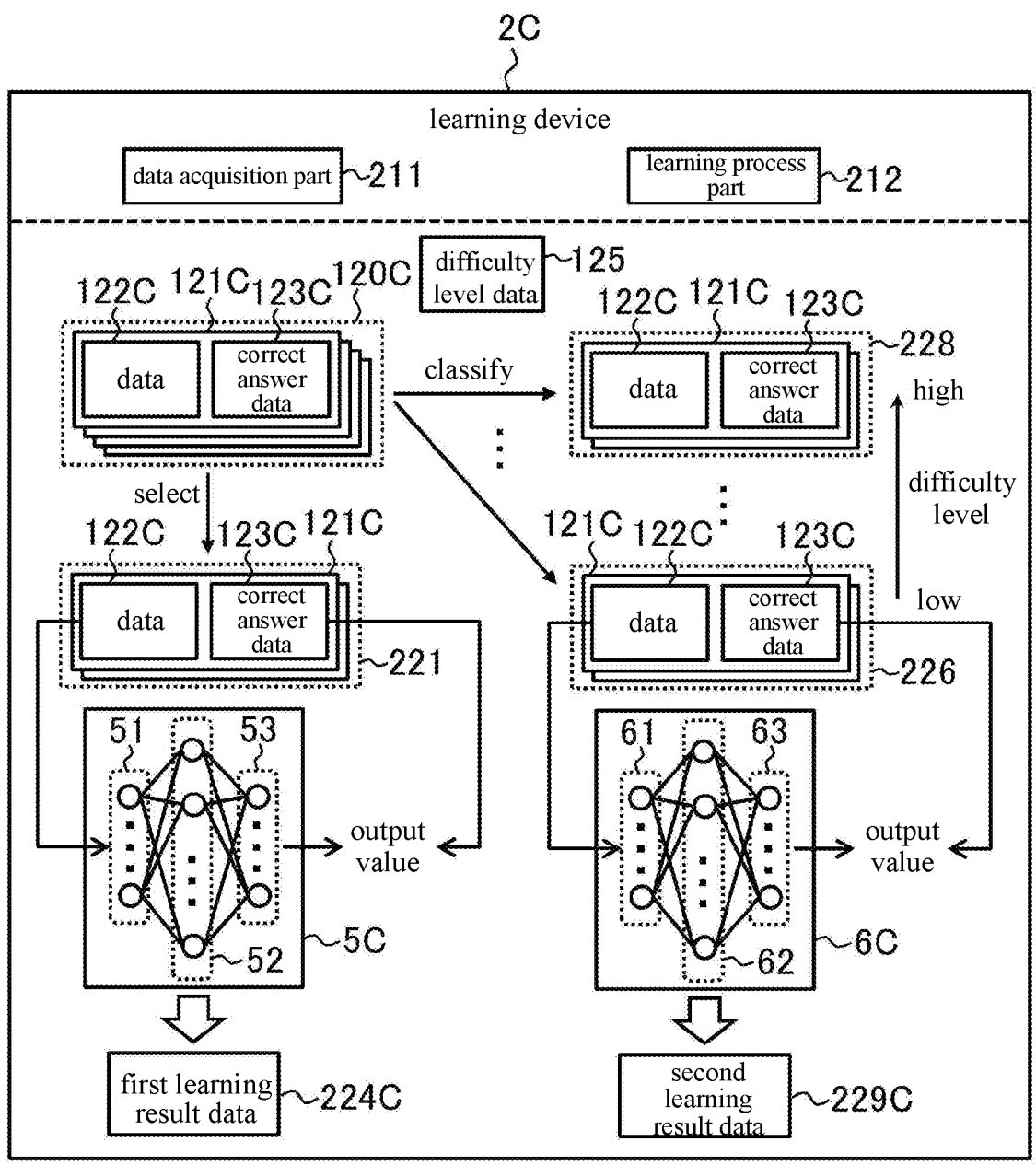
FIG. 16 schematically illustrates an example of a software configuration of a learning device according to another embodiment.
Figure 17:
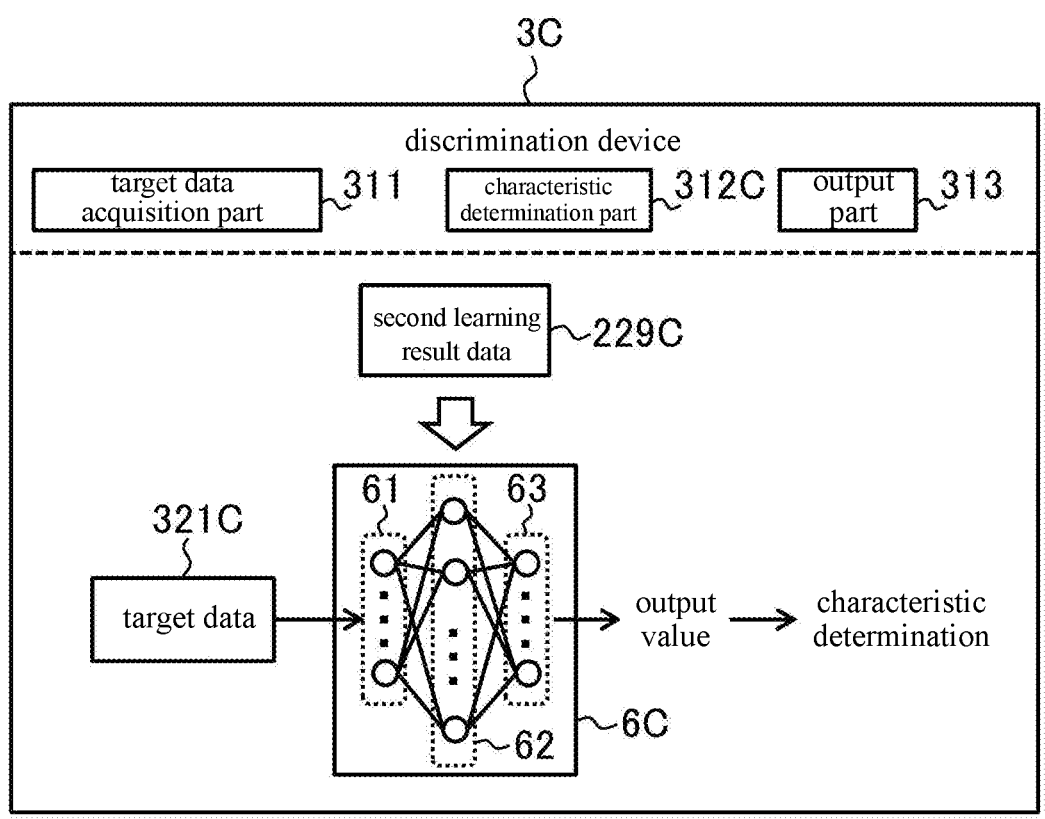
FIG. 17 schematically illustrates an example of a software configuration of a discrimination device according to another embodiment.

FIGS. 15 to 17 schematically illustrate examples of respective software configuration of a learning data generation device 1C, a learning device 2C, and a discrimination device 3C according to the variation example. A discrimination system according to the variation example may be configured similarly to the inspection system 100, except that the data to be processed is replaced with another type of data from the image data. That is, respective hardware configurations of the learning data generation device 1C, the learning device 2C, and the discrimination device 3C may be the same as the respective hardware configurations of the learning data generation device 1, the learning device 2, and the inspection device 3. The software configuration of the learning data generation device 1C may be the same as the software configuration of the learning data generation device 1, except that the data to be processed is replaced. Similarly, the software configuration of the learning device 2C may be the same as the software configuration of the learning device 2, except that the data to be processed is replaced. In addition, the software configuration of the discrimination device 3C may be the same as the software configuration of the inspection device 3, except that the acceptability determination part 312 is with a characteristic determination part 312C.

In the variation example, the data to be process target may include all types of data that can be analysed by the discriminator, which may be, for example, in addition to the image data, sound data (voice data), numerical data, text data, data configured by a combination of these data, or the like. The characteristic may include all characteristics that can be discriminated from the data. When the data to be processed is the sound data, the characteristic to be determined may be, for example, whether a specific sound (for example, an abnormal noise of a machine) is included. When the data to be processed is numerical data or text data related to biological data such as a blood pressure and an activity amount, the characteristic to be determined may be, for example, a state of the object person or the like. In addition, when the data to be processed is numerical data or text data such as a drive amount of the machine, the characteristic to be determined may be, for example, a machine state or the like.

In the variation example, the learning data sets 121 is replaced with learning data sets 121C including a combination of predetermined type of data 122C and correct answer data 123C indicating a correct answer to a result of determining the characteristic included in the data. Thereby, the learning device 2C can construct, by similar processing procedures of the above embodiment, each discriminator that has acquired an ability of determining the state of the subject.

At this time, a control part of the learning device 2C may construct, similarly to the above embodiment, a plurality of first discriminators 5C that has acquired an ability of determining the state of the subject by machine learning under different learning conditions by changing learning conditions and repeating the processes of the above steps S101 to S104. However, the plurality of first discriminator 5C may not be limited to this example. The control part of the learning device 2C may construct two or more first discriminators 5C that has acquired an ability of determining the state of the subject by machine learning under the same learning condition by repeating the processes of the above steps S101 to S104 without changing the learning conditions. After each first discriminator 5C is constructed, the control part of the learning device 2C stores, in a storage part, information indicating a configuration of each first discriminator 5C, a coupling weight between neurons, and a threshold value of each neuron as first learning result data 224C.

In addition, in the variation example, by the process of the above step S201, a control part of the learning data generation device 1C acquires a learning data group 120C configured by a plurality of the learning data sets 121C respectively including a combination of the predetermined type of data 122C and the correct answer data 123C indicating the correct answer to the determination of the characteristic included in the data 122C. Next, by the process of the above step S202, the control part refers to each piece of the first learning result data 224C to set each first discriminator 5C that has acquired an ability of determining the characteristic by machine learning. In the variation example, similarly to the above embodiment, each first discriminator 5C is constructed by the machine learning under different learning conditions. Then, the control part inputs the data 122C of each of the learning data sets 121C to each first discriminator and performed a calculation process of each first discriminator. Thereby, the control part acquires, from each first discriminator 5C, an output value corresponding to the result of determining the characteristic included in the input data 122C. Furthermore, by the process of the above step S203, the control part sets the difficulty level of the determination for each of the learning data sets 121C in accordance with a degree to which the output value acquired from each first discriminator 5C conforms to the correct answer indicated by the correct answer data 123C. As a determination method of the difficulty level, any of the above first to third methods may be employed. In the first method, the control part may set a lower difficulty level for the learning data sets 121C having a higher rate at which the result matches the correct answer indicated by the correct answer data 123C, the result being obtained by determining the characteristic based on the output value acquired from each first discriminator 5C. In addition, in the third method, the control part may set a lower difficulty level for the learning data sets 121C having a greater number of the first discriminator 5C in which the result, which is obtained by determining the characteristic based on the output value, matches the correct answer indicated by the correct answer data 123C at a predetermined confidence level or higher. Then, by the above steps S204 and S205, the control part generates the difficulty level data 125 indicating a corresponding relationship between each of the learning data sets 121C and the set difficulty level and saves the generated difficulty level data 125 to a predetermined storage region together with the learning data group 120C.

In addition, in the variation example, by the processes of the above steps S301 to S303, the control part of the learning device 2C constructs a second discriminator 6C that determines the characteristic by performing stepwise machine learning in which the learning data sets 121C are utilized in ascending order of the set difficulty level. Then, by the process of the above step S204, the control part stores, in a storage part, information indicating a configuration of the second discriminator 6C constructed by the machine learning, a coupling weight between neurons, and a threshold value of each neuron as second learning result data 229C.

In addition, in the variation example, by the process of the above step S401, a control part of the discrimination device 3C operates as the target data acquisition part 311 and acquires target data 321C including a characteristic which is a target to be determined. A method for acquiring the target data 321C may be appropriately determined according to a type of the target data 321C. In step S402, the control part of the discrimination device 3C operated as a characteristic determination part 312C and refers to the second learning result data 229C to set the trained second discriminator 6C. Then, the control part inputs the acquired target data 321C to the second discriminator 6C and performs a calculation process of the second discriminator 6C. Thereby, the control part acquires an output value from the second discriminator 6C and determines the characteristic included in the target data 321C based on the acquired output value. Then, by the process of the above step S403, the control part operates as the output part 313 and outputs the result of determining the characteristic.

As described above, in the variation example, the second discriminator 6C can be constructed which can determine the characteristic included in the target data with relatively high precision. Therefore, in the discrimination device 3C, the characteristic included in the target data 321C can be determined with relatively high precision.

Moreover, in the variation example, by the process of the above step S501, the control part of the learning data generation device 1C may extract learning data sets 180C having a specified difficulty level from the learning data group 120C based on the difficulty level set for each of the learning data sets 121C. Next, by the process of the above step S502, the control part may collect additional data 182C similar to data 122C included in the extracted learning data sets 180C having the specified difficulty level. Whether candidate data of the additional data 182C is similar to the data 122C included in the learning data sets 180C may be appropriately determined according to a type of the data 122C. Then, by the process of the above step S503, the control part may generate new learning data sets 181C by giving correct answer data 183C indicating a correct answer to determination of a characteristic included in the additional data 182C to the collected additional data 182C. Then, by the process of the above step S504, the control part may add the generated new learning data sets 181C to the learning data group 120C.

In addition, similarly to the above <4.5>, also in the variation example, the difficulty level of each of the learning data sets 121C may be determined using one first discriminator instead of using the plurality of the first discriminator 5C. That is, in the above step S202, the control part of the learning data generation device 1C may acquire, by inputting the data 122C of each of the learning data sets 121C to the first discriminators that has acquired an ability of determining the characteristic by machine learning, the output value corresponding to the result of determining the characteristic included in the input data 122C from the first discriminator. Then, in the above step S203, the control part may calculate the distance between the output value acquired from the first discriminator and the decision boundary of the first discriminator for determining the characteristic, and may set the difficulty level of the determination for each of the learning data sets 121C according to the calculated distance.

What is claimed is:

1. An inspection system that inspects acceptability of a product, comprising:
   a first hardware processor, configured to:
   acquire a learning data group which is comprising a plurality of learning data sets respectively comprising a combination of image data of the product and correct answer data indicating a correct answer to determination of the acceptability of the product in the image data; and
   acquire output values corresponding to a result of determining the acceptability of the product in the input image data respectively from a plurality of first discriminators by inputting the image data of each of the learning data sets respectively to the plurality of first discriminators in which an ability to determine the acceptability of the product is acquired by machine learning, and sets a difficulty level of the determination of the acceptability for each of the learning data sets in accordance with a degree to which the output values respectively acquired from the plurality of first discriminators conform to the correct answer indicated by the correct answer data;
   a second hardware processor, configured to construct, by executing stepwise machine learning in which the learning data sets are utilized in ascending order of the set difficulty level, a second discriminator which determines the acceptability of the product; and
   a third hardware processor, configured to:
   acquire target image data of the product which is an inspection target; and acquire an output value from the second discriminator by inputting the acquired target image data to the second discriminator, and determines the acceptability of the product in the target image data based on the output value acquired from the second discriminator, wherein each of the first discriminators is constructed by machine learning using a partial data group comprising a plurality of learning data sets selected from the learning data group, wherein the first hardware processor sets the difficulty level of the determination of the acceptability for each of the learning data sets in accordance with a degree to which a sum or a product of the output values respectively acquired from the plurality of first discriminators conforms to the correct answer indicated by the correct answer data.

2. The inspection system according to claim 1, wherein the first hardware processor sets a lower difficulty level for the learning data sets having a higher rate at which a result matches the correct answer indicated by the correct answer data, the result being obtained by determining the acceptability of the product based on the output values acquired from the plurality of first discriminators.

3. The inspection system according to claim 1, wherein the first hardware processor sets a lower difficulty level for the learning data sets having a greater number of the first discriminators in which the result, which is obtained by determining the acceptability of the product based on the output values, matches the correct answer indicated by the correct answer data at a predetermined confidence level or higher.

4. The inspection system according to claim 1, wherein the first hardware processor extracts learning data sets having a specified difficulty level from the learning data group based on the difficulty level set for each of the learning data sets;

collects additional image data similar to the image data included in the extracted learning data sets having a specified difficulty level;

generates new learning data sets by giving correct answer data indicating a correct answer to determination of acceptability of the product in the additional image data to the collected additional image data; and adds the generated new learning data sets to the learning data group.

5. A learning data generation device, comprising:

a hardware processor, configured to:

acquire a learning data group which is comprising a plurality of learning data sets respectively comprising a combination of image data of a product and correct answer data indicating a correct answer to determination of the acceptability of the product in the image data;

acquire output values corresponding to a result of determining the acceptability of the product in the input image data respectively from a plurality of first discriminators by inputting the image data of each of the learning data sets respectively to the plurality of first discriminators in which an ability to determine the acceptability of the product is acquired by machine learning, and sets a difficulty level of the determination of the acceptability for each of the learning data sets in accordance with a degree to which the output values respectively acquired from the plurality of first discriminators conform to the correct answer indicated by the correct answer data; and generate difficulty level data indicating a corresponding relationship between each of the learning data sets and the set difficulty level, and saves the generated difficulty level data to a predetermined storage region together with the learning data group, wherein each of the first discriminators is constructed by machine learning using a partial data group comprising a plurality of learning data sets selected from the learning data group, wherein the hardware processor sets the difficulty level of the determination of the acceptability for each of the learning data sets in accordance with a degree to which a sum or a product of the output values respectively acquired from the plurality of first discriminators conforms to the correct answer indicated by the correct answer data.

6. An inspection system that inspects acceptability of a product, comprising:

a first hardware processor, configured to:

acquire a learning data group which is comprising a plurality of learning data sets respectively comprising a combination of image data of the product and correct answer data indicating a correct answer to determination of the acceptability of the product in the image data; and acquire output values corresponding to a result of determining the acceptability of the product in the input image data from a first discriminator by inputting the image data of each of the learning data sets to the first discriminator in which an ability to determine the acceptability of the product is acquired by machine learning, calculates a distance between the output values acquired from the first discriminator and a decision boundary of the first discriminator for determining the acceptability of the product, and sets a difficulty level of the determination of the acceptability for each of the learning data sets in accordance with the calculated distance;

a second hardware processor, configured to construct, by executing stepwise machine learning in which the learning data sets are utilized in ascending order of the set difficulty level, a second discriminator which determines the acceptability of the product; and a third hardware processor, configured to:

acquire target image data of the product which is an inspection target; and acquire an output value from the second discriminator by inputting the acquired target image data to the second discriminator, and determines the acceptability of the product in the target image data based on the output value acquired from the second discriminator, wherein each of first discriminators is constructed by machine learning using a partial data group comprising a plurality of learning data sets selected from the learning data group, wherein the first hardware processor sets the difficulty level of the determination of the acceptability for each of the learning data sets in accordance with a degree to which a sum or a product of the output values respectively acquired from the first discriminators conforms to the correct answer indicated by the correct answer data.

7. A learning data generation device, comprising:

a hardware processor, configured to:

acquire a learning data group which is comprising a plurality of learning data sets respectively comprising a combination of image data of a product and correct answer data indicating a correct answer to determination of the acceptability of the product in the image data;

acquire output values corresponding to a result of determining the acceptability of the product in the input image data from a first discriminator by inputting the image data of each of the learning data sets to the first discriminator in which an ability to determine the acceptability of the product is acquired by machine learning, calculates a distance between the output values acquired from the first discriminator and a decision boundary of the first discriminator for determining the acceptability of the product, and sets a difficulty level of the determination of the acceptability for each of the learning data sets in accordance with the calculated distance; and generate difficulty level data indicating a corresponding relationship between each of the learning data sets and the set difficulty level, and saves the generated difficulty level data to a predetermined storage region together with the learning data group, wherein each of first discriminators is constructed by machine learning using a partial data group comprising a plurality of learning data sets selected from the learning data group, wherein the hardware processor sets the difficulty level of the determination of the acceptability for each of the learning data sets in accordance with a degree to which a sum or a product of the output values respectively acquired from the first discriminators conforms to the correct answer indicated by the correct answer data.

8. A discrimination system, comprising:

a first hardware processor, configured to:

acquire a learning data group which is comprising a plurality of learning data sets respectively comprising a combination of image data and correct answer data indicating a correct answer to determination of a state of a subject in the image data; and acquire output values corresponding to a result of determining the state of the subject in the input image data respectively from a plurality of first discriminators by inputting the image data of each of the learning data sets respectively to the plurality of first discriminators in which an ability to determine the state of the subject is acquired by machine learning, and sets a difficulty level of the determination for each of the learning data sets in accordance with a degree to which the output values respectively acquired from the plurality of first discriminators conform to the correct answer indicated by the correct answer data;

a second hardware processor, configured to construct, by executing stepwise machine learning in which the learning data sets are utilized in ascending order of the set difficulty level, a second discriminator which determines the state of the subject; and a third hardware processor, configured to:

acquire target image data of the subject which is a target of which the state is to be determined; and acquire an output value from the second discriminator by inputting the acquired target image data to the second discriminator, and determines the state of the subject in the target image data based on the output value acquired from the second discriminator, wherein each of the first discriminators is constructed by machine learning using a partial data group comprising a plurality of learning data sets selected from the learning data group, wherein the first hardware processor sets the difficulty level of the determination of acceptability for each of the learning data sets in accordance with a degree to which a sum or a product of the output values respectively acquired from the plurality of first discriminators conforms to the correct answer indicated by the correct answer data.

9. A learning data generation device, comprising:

a hardware processor, configured to:

acquire a learning data group which is comprising a plurality of learning data sets respectively comprising a combination of image data and correct answer data indicating a correct answer to determination of a state of a subject in the image data;

acquire output values corresponding to a result of determining the state of the subject in the input image data respectively from a plurality of first discriminators by inputting the image data of each of the learning data sets respectively to the plurality of first discriminators in which an ability to determine the state of the subject is acquired by machine learning, and sets a difficulty level of the determination for each of the learning data sets in accordance with a degree to which the output values respectively acquired from the plurality of first discriminators conform to the correct answer indicated by the correct answer data; and generate difficulty level data indicating a corresponding relationship between each of the learning data sets and the set difficulty level, and saves the generated difficulty level data to a predetermined storage region together with the learning data group, wherein each of the first discriminators is constructed by machine learning using a partial data group comprising a plurality of learning data sets selected from the learning data group, wherein the hardware processor sets the difficulty level of the determination of acceptability for each of the learning data sets in accordance with a degree to which a sum or a product of the output values respectively acquired from the plurality of first discriminators conforms to the correct answer indicated by the correct answer data.

10. A discrimination system, comprising:

a first hardware processor, configured to:

acquire a learning data group which is comprising a plurality of learning data sets respectively comprising a combination of image data and correct answer data indicating a correct answer to determination of a state of a subject in the image data; and acquire output values corresponding to a result of determining the state of the subject in the input image data from a first discriminator by inputting the image data of each of the learning data sets to the first discriminator in which an ability to determine the state of the subject is acquired by machine learning, calculates a distance between the output values acquired from the first discriminator and a decision boundary of the first discriminator for determining the state of the subject, and sets a difficulty level of the determination for each of the learning data sets in accordance with the calculated distance;

a second hardware processor, configured to construct, by executing stepwise machine learning in which the learning data sets are utilized in ascending order of the set difficulty level, a second discriminator which determines the state of the subject; and a third hardware processor, configured to:
acquire target image data of the subject which is a target of which the state is to be determined; and
acquire an output value from the second discriminator by inputting the acquired target image data to the second discriminator, and determines the state of the subject in the target image data based on the output value acquired from the second discriminator,
wherein each of first discriminators is constructed by machine learning using a partial data group comprising a plurality of learning data sets selected from the learning data group,
wherein the first hardware processor sets the difficulty level of the determination of acceptability for each of the learning data sets in accordance with a degree to which a sum or a product of the output values respectively acquired from the first discriminators conforms to the correct answer indicated by the correct answer data.

11. A learning data generation device, comprising:
a hardware processor, configured to:
acquire a learning data group which is comprising a plurality of learning data sets respectively comprising a combination of image data and correct answer data indicating a correct answer to determination of a state of a subject in the image data;
acquire output values corresponding to a result of determining the state of the subject in the input image data from a first discriminator by inputting the image data of each of the learning data sets to the first discriminator in which an ability to determine the state of the subject is acquired by machine learning, calculates a distance between the output values acquired from the first discriminator and a decision boundary of the first discriminator for determining the state of the subject, and sets a difficulty level of the determination for each of the learning data sets in accordance with the calculated distance; and
generate difficulty level data indicating a corresponding relationship between each of the learning data sets and the set difficulty level, and saves the generated difficulty level data to a predetermined storage region together with the learning data group,
wherein each of first discriminators is constructed by machine learning using a partial data group comprising a plurality of learning data sets selected from the learning data group,
wherein the hardware processor data sets the difficulty level of the determination of acceptability for each of the learning data sets in accordance with a degree to which a sum or a product of the output values respectively acquired from the first discriminators conforms to the correct answer indicated by the correct answer data.

12. A discrimination system, comprising:
a first hardware processor, configured to:
acquire a learning data group which is comprising a plurality of learning data sets respectively comprising a combination of a predetermined type of data and correct answer data indicating a correct answer to determination of a characteristic included in the data; and
acquire output values corresponding to a result of determining the characteristic included in the data respectively from a plurality of first discriminators by inputting the data of each of the learning data sets respectively to the plurality of first discriminators in which an ability to determine the characteristic is acquired by machine learning, and sets a difficulty level of the determination for each of the learning data sets in accordance with a degree to which the output values respectively acquired from the plurality of first discriminators conform to the correct answer indicated by the correct answer data;
a second hardware processor, configured to construct, by executing stepwise machine learning in which the learning data sets are utilized in ascending order of the set difficulty level, a second discriminator which determines the characteristic; and
a third hardware processor, configured to:
acquire target data comprising the characteristic which is a target to be determined; and
acquire an output value from the second discriminator by inputting the acquired target data to the second discriminator, and determines the characteristic included in the target data based on the output value acquired from the second discriminator,
wherein each of the first discriminators is constructed by machine learning using a partial data group comprising a plurality of learning data sets selected from the learning data group,
wherein the first hardware processor sets the difficulty level of the determination of acceptability for each of the learning data sets in accordance with a degree to which a sum or a product of the output values respectively acquired from the plurality of first discriminators conforms to the correct answer indicated by the correct answer data.

13. The discrimination system according to claim 12, wherein
the first hardware processor sets a lower difficulty level for the learning data sets having a higher rate at which a result matches the correct answer indicated by the correct answer data, the result being obtained by determining the characteristic based on the output values acquired from the plurality of first discriminators.

14. The discrimination system according to claim 12, wherein
the first hardware processor sets a lower difficulty level for the learning data sets having a greater number of the first discriminators in which the result, which is obtained by determining the characteristic based on the output values, matches the correct answer indicated by the correct answer data at a predetermined confidence level or higher.

15. The discrimination system according to claim 12, wherein
the first hardware processor
extracts learning data sets having a specified difficulty level from the learning data group based on the difficulty level set for each of the learning data sets;
collects additional data similar to the data included in the extracted learning data sets having a specified difficulty level;
generates new learning data sets by giving correct answer data indicating a correct answer to determination of the characteristic included in the data to the collected additional data; and
adds the generated new learning data sets to the learning data group.

16. The discrimination system according to claim 12, wherein
the plurality of first discriminators are respectively constructed by machine learning having different learning conditions.

17. A learning data generation device, comprising:
a hardware processor, configured to:
acquire a learning data group which is comprising a plurality of learning data sets respectively comprising a combination of a predetermined type of data and correct answer data indicating a correct answer to determination of a characteristic included in the data;
acquire output values corresponding to a result of determining the characteristic included in the data respectively from a plurality of first discriminators by inputting the data of each of the learning data sets respectively to the plurality of first discriminators in which an ability to determine the characteristic is acquired by machine learning, and sets a difficulty level of the determination for each of the learning data sets in accordance with a degree to which the output values respectively acquired from the plurality of first discriminators conform to the correct answer indicated by the correct answer data; and
generate difficulty level data indicating a corresponding relationship between each of the learning data sets and the set difficulty level, and saves the generated difficulty level data to a predetermined storage region together with the learning data group,
wherein each of the first discriminators is constructed by machine learning using a partial data group comprising a plurality of learning data sets selected from the learning data group,
wherein the hardware processor sets the difficulty level of the determination of acceptability for each of the learning data sets in accordance with a degree to which a sum or a product of the output values respectively acquired from the plurality of first discriminators conforms to the correct answer indicated by the correct answer data.

18. A discrimination system, comprising:
a first hardware processor, configured to:
acquire a learning data group which is comprising a plurality of learning data sets respectively comprising a combination of a predetermined type of data and correct answer data indicating a correct answer to determination of a characteristic included in the data; and
acquire output values corresponding to a result of determining the characteristic included in the input data from a first discriminator by inputting the data of each of the learning data sets to the first discriminator in which an ability to determine the characteristic is acquired by machine learning, calculates a distance between the output values acquired from the first discriminator and a decision boundary of the first discriminator for determining the characteristic, and sets a difficulty level of the determination for each of the learning data sets in accordance with the calculated distance;
a second hardware processor, configured to construct, by executing stepwise machine learning in which the learning data sets are utilized in ascending order of the set difficulty level, a second discriminator which determines the characteristic; and
a third hardware processor, configured to:
acquire target data comprising the characteristic which is a target to be determined; and
acquire an output value from the second discriminator by inputting the acquired target data to the second discriminator, and determines the characteristic included in the target data based on the output value acquired from the second discriminator,
wherein each of first discriminators is constructed by machine learning using a partial data group comprising a plurality of learning data sets selected from the learning data group,
wherein the first hardware processor sets the difficulty level of the determination of acceptability for each of the learning data sets in accordance with a degree to which a sum or a product of the output values respectively acquired from the first discriminators conforms to the correct answer indicated by the correct answer data.

19. A learning data generation device, comprising:
a hardware processor, configured to:
acquire a learning data group which is comprising a plurality of learning data sets respectively comprising a combination of a predetermined type of data and correct answer data indicating a correct answer to determination of a characteristic included in the data;
acquire output values corresponding to a result of determining the characteristic included in the input data from a first discriminator by inputting the data of each of the learning data sets to the first discriminator in which an ability to determine the characteristic is acquired by machine learning, calculates a distance between the output values acquired from the first discriminator and a decision boundary of the first discriminator for determining the characteristic, and sets a difficulty level of the determination for each of the learning data sets in accordance with the calculated distance; and
generate difficulty level data indicating a corresponding relationship between each of the learning data sets and the set difficulty level, and saves the generated difficulty level data to a predetermined storage region together with the learning data group,
wherein each of first discriminators is constructed by machine learning using a partial data group comprising a plurality of learning data sets selected from the learning data group,
wherein the hardware processor sets the difficulty level of the determination of acceptability for each of the learning data sets in accordance with a degree to which a sum or a product of the output values respectively acquired from the first discriminators conforms to the correct answer indicated by the correct answer data.

* * * * *